US012642750B2

(12) United States Patent
Niitsuma et al.

(10) Patent No.: US 12,642,750 B2
(45) Date of Patent: Jun. 2, 2026

(54) MEDICATION SUPPORT DEVICE

(71) Applicants: Youhei Niitsuma, Kanagawa (JP); Hirotaka Hayashi, Kanagawa (JP); Hiroshi Fujie, Kanagawa (JP); Manabu Yamanaka, Kanagawa (JP); Yu Yamaya, Kanagawa (JP)

(72) Inventors: Youhei Niitsuma, Kanagawa (JP); Hirotaka Hayashi, Kanagawa (JP); Hiroshi Fujie, Kanagawa (JP); Manabu Yamanaka, Kanagawa (JP); Yu Yamaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 186 days.

(21) Appl. No.: 18/319,050

(22) Filed: May 17, 2023

(65) Prior Publication Data

US 2023/0372203 A1 Nov. 23, 2023

(30) Foreign Application Priority Data

May 23, 2022 (JP) ................................ 2022-084175
Mar. 20, 2023 (JP) ................................ 2023-044791

(51) Int. Cl.
*A61J 7/00* (2006.01)
*A61J 7/04* (2006.01)

(52) U.S. Cl.
CPC ........... *A61J 7/0084* (2013.01); *A61J 7/0454* (2015.05); *A61J 7/0463* (2015.05); *A61J 7/049* (2015.05); *A61J 2205/10* (2013.01)

(58) Field of Classification Search
CPC .................................................... A61J 7/0084
See application file for complete search history.

(56) References Cited

U.S. PATENT DOCUMENTS 5,468,110 A * 11/1995 McDonald .......... G07F 17/0092 414/268
6,176,392 B1 * 1/2001 William .................. G07F 11/24 221/109

(Continued)

FOREIGN PATENT DOCUMENTS

CN 1635970 A 7/2005
JP 2015-187840 10/2015

(Continued)

OTHER PUBLICATIONS

Chinese Office Action dated Aug. 8, 2025 for corresponding Chinese Application No. 202310581838.3.

*Primary Examiner* — Gene O Crawford
*Assistant Examiner* — Ayodeji T Ojofeitimi
(74) *Attorney, Agent, or Firm* — Harness, Dickey & Pierce, P.L.C.

(57) ABSTRACT

A medication support device includes a container to store a plurality of medicine packs, a medicine dispenser in which a specific one of the plurality of medicine packs is arranged to a prescribed position, a pickup device to pick up a specific one of the plurality of medicine packs from the container, a conveyor to convey the specific one of the plurality of medicine packs picked up from the container, a medication-related information reader to read medication-related information of the plurality of medicine packs including at least a name of a patient who takes a medicine and a time of medication, a pack data management system to manage the medication-related information of the plurality of medicine packs, and a medicine dispensing data management system to read and manage medicine dispensing data including at least the name of the patient who takes the medicine and the time of medication.

20 Claims, 27 Drawing Sheets

(56) References Cited

U.S. PATENT DOCUMENTS

| | | | | |
|---|---|---|---|---|
| 2006/0230710 | A1 | 10/2006 | Ishiwatari et al. | |
| 2008/0017660 | A1* | 1/2008 | Faes | G07F 11/163 221/258 |
| 2010/0176146 | A1* | 7/2010 | Ben-Dor | A61J 7/0084 221/97 |
| 2016/0022541 | A1* | 1/2016 | Dalal | A61J 7/0084 221/9 |
| 2019/0102965 | A1* | 4/2019 | Greyshock | G07F 11/60 |
| 2021/0022962 | A1* | 1/2021 | Arias | A61J 7/0445 |
| 2021/0361532 | A1 | 11/2021 | Hayashi et al. | |
| 2022/0233406 | A1 | 7/2022 | Kojima et al. | |
| 2023/0096511 | A1 | 3/2023 | Morinaga et al. | |

FOREIGN PATENT DOCUMENTS

| | | |
|---|---|---|
| JP | 3218454 U | 10/2018 |
| JP | 2019-071135 | 5/2019 |
| JP | 2020-058613 | 4/2020 |
| JP | 2020-177263 | 10/2020 |
| JP | 2021-007044 | 1/2021 |
| JP | 2021-132902 | 9/2021 |
| JP | 2021-185976 | 12/2021 |

* cited by examiner

A: AFTER BREAKFAST
A: AFTER BREAKFAST
A: AFTER BREAKFAST
A: AFTER BREAKFAST
2
2A
2a
2b
3
4
5
6a
6b
6c
8
A
1

FIG. 18

TABLE OF MEDICATION ADMINISTRATION

1F

| MONTH / DAY | 7/10 SAT | | | | 7/11 SUN | | | | 7/12 MON | | | | 7/13 TUE | | | | 7/14 WED | | | | 7/15 THU | | | | 7/16 FRI | | | |
|---|---|---|---|---|---|---|---|---|---|---|---|---|---|---|---|---|---|---|---|---|---|---|---|---|---|---|---|---|
| | L | E | B | M | L | E | B | M | L | E | B | M | L | E | B | M | L | E | B | M | L | E | B | M | L | E | B | M |
| MIDORI EBINA | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ |
| KENTA KANAGAWA | | ✓ | | ✓ | | ✓ | | ✓ | | ✓ | | ✓ | | ✓ | | ✓ | | ✓ | | ✓ | | ✓ | | ✓ | | ✓ | | ✓ |
| NOHARU KITANO | | | ✓ | ✓ | | | ✓ | ✓ | | | ✓ | ✓ | | | ✓ | ✓ | | | ✓ | ✓ | | | ✓ | ✓ | | | ✓ | ✓ |
| KUNIICHI KITANO | | | | ✓ | | | | ✓ | | | | ✓ | | | | ✓ | | | | ✓ | | | | ✓ | | | | ✓ |
| ICHIKO SAPPORO | | ✓ | | ✓ | | ✓ | | ✓ | | ✓ | | ✓ | | ✓ | | ✓ | | ✓ | | ✓ | | ✓ | | ✓ | | ✓ | | ✓ |
| DAISUKE TOKEI | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | |
| MICHIYO HOKKAI | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ |
| HANAKO FURANO | | | ✓ | | | | ✓ | | | | ✓ | | | | ✓ | | | | ✓ | | | | ✓ | | | | ✓ | |
| MIRAI MINATO | | ✓ | ✓ | | | ✓ | ✓ | | | ✓ | ✓ | | | ✓ | ✓ | | | ✓ | ✓ | | | ✓ | ✓ | | | ✓ | ✓ | |
| MARIN YOKOHAMA | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ |

L: LUNCHTIME
E: EVENING
B: BEDTIME
M: MORNING

FIG. 23

1F

TABLE OF MEDICATION ADMINISTRATION

| MONTH / DAY | 7/10 SAT | | | | 7/11 SUN | | | | 7/12 MON | | | | 7/13 TUE | | | | 7/14 WED | | | | 7/15 THU | | | | 7/16 FRI | | | |
|---|---|---|---|---|---|---|---|---|---|---|---|---|---|---|---|---|---|---|---|---|---|---|---|---|---|---|---|---|
| | L | E | B | M | L | E | B | M | L | E | B | M | L | E | B | M | L | E | B | M | L | E | B | M | L | E | B | M |
| MIDORI EBINA | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ |
| KENTA KANAGAWA | | ✓ | | ✓ | | ✓ | | ✓ | | ✓ | | ✓ | | ✓ | | ✓ | | ✓ | | ✓ | | ✓ | | ✓ | | ✓ | | ✓ |
| NOHARU KITANO | | | ✓ | ✓ | | | ✓ | ✓ | | | ✓ | ✓ | | | ✓ | ✓ | | | ✓ | ✓ | | | ✓ | ✓ | | | ✓ | ✓ |
| KUNIICHI KITANO | | | | ✓ | | | | ✓ | | | | ✓ | | | | ✓ | | | | ✓ | | | | ✓ | | | | ✓ |
| ICHIKO SAPPORO | | ✓ | | ✓ | | ✓ | | ✓ | | ✓ | | ✓ | | ✓ | | ✓ | | ✓ | | ✓ | | ✓ | | ✓ | | ✓ | | ✓ |
| DAISUKE TOKEI | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | |
| MICHIYO HOKKAI | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ |
| HANAKO FURANO | | | ✓ | | | | ✓ | | | | ✓ | | | | ✓ | | | | ✓ | | | | ✓ | | | | ✓ | |
| MIRAI MINATO | | ✓ | ✓ | | | ✓ | ✓ | | | ✓ | ✓ | | | ✓ | ✓ | | | ✓ | ✓ | | | ✓ | ✓ | | | ✓ | ✓ | |
| MARIN YOKOHAMA | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ | ✓ | ✓ | | ✓ |

L: LUNCHTIME
E: EVENING
B: BEDTIME
M: MORNING

FIG. 24

TABLE OF MEDICATION ADMINISTRATION

1F

| | L | E | B | M |
|---|---|---|---|---|
| MIDORI EBINA | ✓ | ✓ | | ✓ |
| KENTA KANAGAWA | | ✓ | | ✓ |
| NOHARU KITANO | | | ✓ | ✓ |
| KUNIICHI KITANO | | | | ✓ |
| ICHIKO SAPPORO | | ✓ | | ✓ |
| DAISUKE TOKEI | ✓ | ✓ | ✓ | |
| MICHIYO HOKKAI | ✓ | ✓ | | ✓ |
| HANAKO FURANO | | | ✓ | |
| MIRAI MINATO | | ✓ | ✓ | |
| MARIN YOKOHAMA | ✓ | ✓ | | ✓ |
| MARIN YOKOHAMA (ADMINISTRATION EVERY FRIDAY) | | | | |
| MARIN YOKOHAMA (ADMINISTRATION ONCE A MONTH) | ✓ | | | |
| MARIN YOKOHAMA (MANUAL) | | | | |

L: LUNCHTIME
E: EVENING
B: BEDTIME
M: MORNING

FIG. 25

1F

TABLE OF MEDICATION ADMINISTRATION

| | EVERYDAY | | | | ONCE A WEEK | | | | ONCE A WEEK | | | | ONCE A WEEK | | | | ONCE A WEEK | | | | ONCE A WEEK | | | | ONCE A MONTH | | | |
|---|---|---|---|---|---|---|---|---|---|---|---|---|---|---|---|---|---|---|---|---|---|---|---|---|---|---|---|---|
| NAME | L | E | B | M | L | E | B | M | L | E | B | M | L | E | B | M | L | E | B | M | L | E | B | M | L | E | B | M |
| MIDORI EBINA | ✓ | ✓ | | ✓ | | | | | | | | | | | | | | | | | | | | | | | | |
| KENTA KANAGAWA | | ✓ | | ✓ | | | | | | | | | | | | | | | | | | | | | | | | |
| NOHARU KITANO | | | ✓ | ✓ | | | | | | | | | | | | | | | | | | | | | | | | |
| KUNIICHI KITANO | | | | ✓ | | | | | | | | | | | | | | | | | | | | | | | | |
| ICHIKO SAPPORO | | ✓ | | ✓ | | | | | | | | | | | | | | | | | | | | | | | | |
| DAISUKE TOKEI | ✓ | ✓ | ✓ | | | | | | | | | | | | | | | | | | | | | | | | | |
| MICHIYO HOKKAI | ✓ | ✓ | | ✓ | | | | | | | | | | | | | | | | | | | | | | | | |
| HANAKO FURANO | | | ✓ | | | | | | | | | | | | | | | | | | | | | | | | | |
| MIRAI MINATO | | ✓ | ✓ | | | | | | | | | | | | | | | | | | | | | | | | | |
| MARIN YOKOHAMA | ✓ | ✓ | | ✓ | | | FRI | | | | | | | | | | | | | | | | | | | | | 10 |

L: LUNCHTIME
E: EVENING
B: BEDTIME
M: MORNING

MEDICATION SUPPORT DEVICE

CROSS-REFERENCE TO RELATED APPLICATIONS

This patent application is based on and claims priority pursuant to 35 U.S.C. § 119(a) to Japanese Patent Application Nos. 2022-084175 and 2023-044791, filed on May 23, 2022, and Mar. 20, 2023, respectively, in the Japan Patent Office, the entire disclosures of which are hereby incorporated by reference herein.

BACKGROUND

Technical Field

Embodiments of the present disclosure relate to a medication support device.

Background Art

For the purposes of reducing the time for the operation and preventing the chances of medication error by nurse practitioners or the like who work at, for example, day-care center or nursing home, some technologies have been proposed that, at the prescribed time, one pack is picked up from a container (cartridge that stores a plurality of medicine packages and the pack of medicine is dispensed to a medicine dispenser such as a medicine dispensing tray.

SUMMARY

Embodiments of the present disclosure described herein provide a medication support device including a container to store a plurality of medicine packs, a medicine dispenser in which a specific one of the plurality of medicine packs is arranged to a prescribed position, a pickup device to pick up a specific one of the plurality of medicine packs from the container, a conveyor to convey the specific one of the plurality of medicine packs picked up from the container, a medication-related information reader to read medication-related information of the plurality of medicine packs including at least a name of a patient who takes a medicine and a time of medication, a pack data management system to manage the medication-related information of the plurality of medicine packs, and a medicine dispensing data management system to read and manage medicine dispensing data including at least the name of the patient who takes the medicine and the time of medication. In the medication support device, the medicine dispensing data is checked against the medication-related information before the medicine is dispensed.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 18 is a table of medication administration, which serves as a medicine dispensing data file, according to an embodiment of the present disclosure.

FIG. 23 is a table of medication administration obtained by printing the chart of medicine dispensing management as illustrated in FIG. 21, according to an embodiment of the present disclosure.

FIG. 24 is a table of medication administration different from the table of medication administration as illustrated in FIG. 18, according to an embodiment of the present disclosure.

FIG. 25 is another different table of medication administration according to an embodiment of the present disclosure.

Figure 1B:
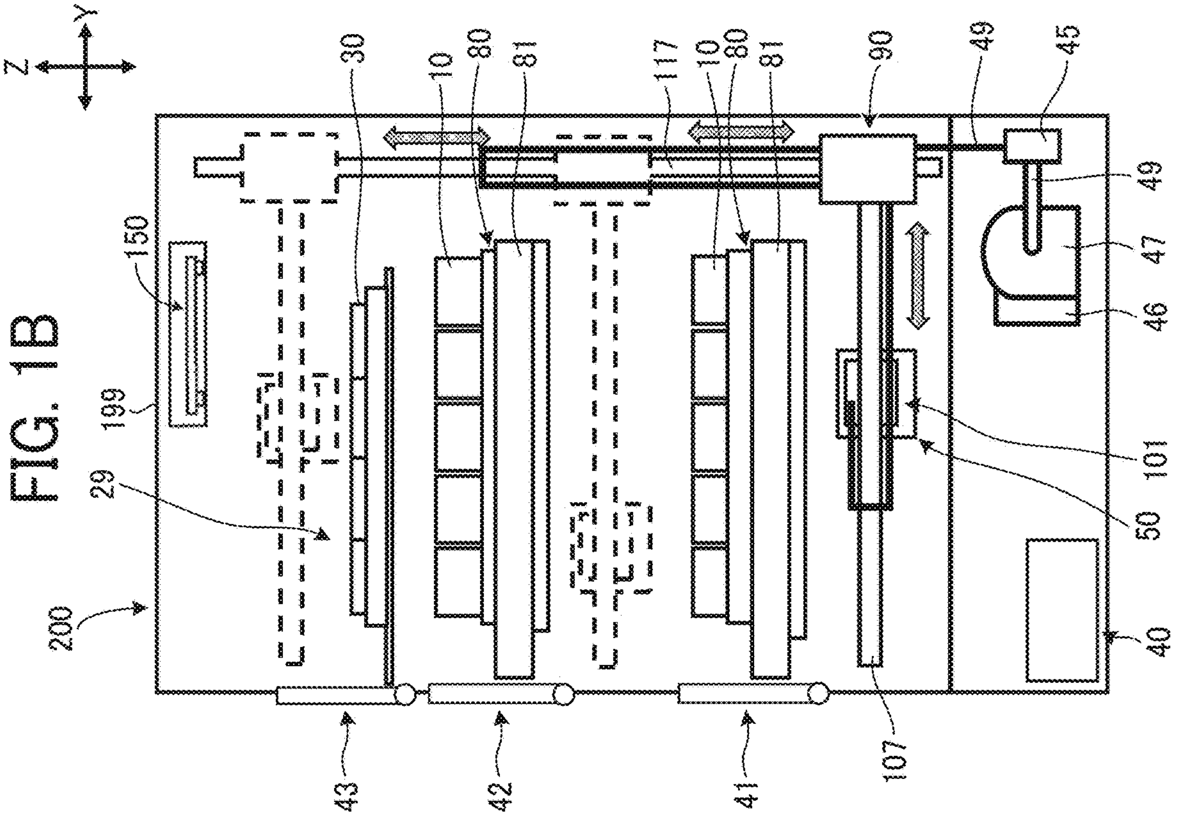
FIG. 1B is a side view the medicine dispensing apparatus of FIG. 1A, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure and examples of the present disclosure are described below in detail with reference to the accompanying drawings. In the drawings and the description of the embodiments and examples of the present disclosure, like reference signs denote like elements such as members or components of similar shapes or similar functionality, and overlapping description may be omitted where appropriate unless there is concern about the possibility of confusion.

A basic and overall configuration or structure of a medicine dispensing apparatus 200 that makes up a medication support device 300 according to an embodiment of the present disclosure is described with reference to FIG. 1A and FIG. 1B.

Figure 1A:
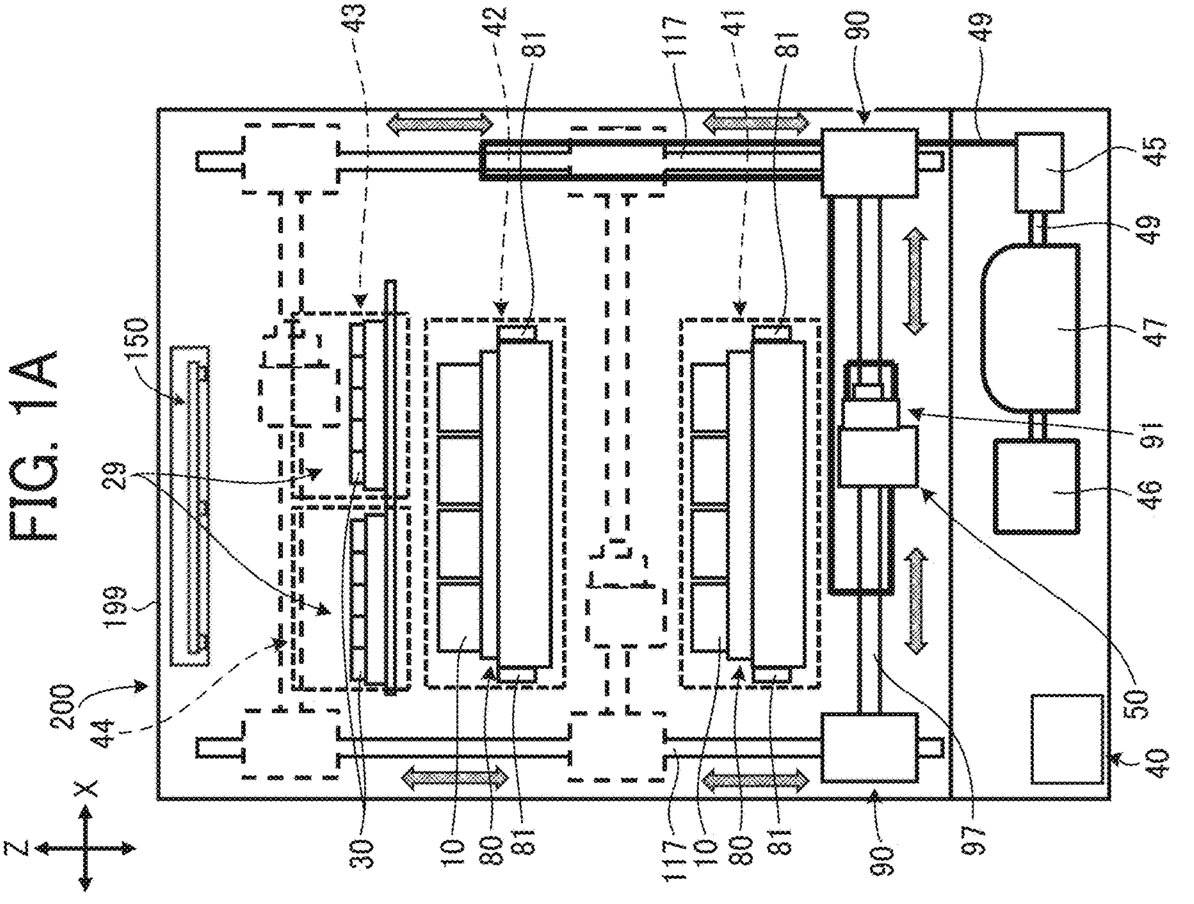
FIG. 1A is a schematic front view of a medicine dispensing apparatus that makes up a medication support device, according to an embodiment of the present disclosure.

FIG. 1A is a schematic front view of the medicine dispensing apparatus 200, illustrating a basic and overall configuration or structure of the medicine dispensing apparatus 200, according to the present embodiment.

FIG. 1B is a schematic side view of the medicine dispensing apparatus 200 of FIG. 1A, illustrating its configuration or structure, according to the present embodiment.

As illustrated in FIG. 1A and FIG. 1B, the medicine dispensing apparatus 200 according to the present embodiment is provided with a plurality of cartridges 10 each of which is also referred to as a first holder, a plurality of cartridge trays 20 each of which is also referred to as a second holder, a drawer 80, a medicine dispensing tray 30, a carriage 50 that is also referred to as a pickup unit, a conveyance unit 90, a first gate 41, a second gate 42, a third gate 43, and a fourth gate 44, as basic elements. In FIG. 1A and FIG. 1B, the horizontal direction or the right and left directions of the medicine dispensing apparatus 200 is defined as an X-direction, where the horizontal direction or the right and left directions of the medicine dispensing apparatus 200 is also referred to as the width direction of the medicine dispensing apparatus 200. In FIG. 1A and FIG. 1B, the front-rear direction or the depth direction of the medicine dispensing apparatus 200 is defined as a Y-direction, and the up and down directions or the orthogonal direction of the medicine dispensing apparatus 200 is defined as a Z-direction, where the up and down directions or the orthogonal direction of the medicine dispensing apparatus 200 is also referred to as the vertical direction. The same applies to the other drawings as will be described later in detail.

Each one of the multiple cartridges 10 serves as a first container in which, for example, a plurality of medicine packages 2 packing a several kinds of medicines 3 or a plurality of bound medicine packages 2A, as will be described later, are stored upon being stacked on top of each other in layers. The medicine package 2 according to the present embodiment may be referred to simply as a pack or a medicine pack in the following description. The multiple cartridges 10 are arranged at a middle portion and a lower portion of the housing 199 of the medicine dispensing apparatus 200 through the cartridge tray 20. In the present embodiment, the multiple cartridges 10 are attachable to and detachable from the cartridge tray 20 that serves as a second container. The expression "stored upon being stacked on top of each other in layers" in the present disclosure indicates keeping the packs horizontally in such a manner that the front face is viewable.

As will be described later in detail, the cartridge tray 20 can store a plurality of cartridges 10 upon positioning those cartridges as desired. The cartridge tray 20 according to the present embodiment serves as a second container in which at least one of the multiple cartridges 10 is placed and held.

A plurality of cartridges 10 are placed in the pair of drawers 80 through the cartridge tray 20. One of the pair of drawers 80 is arranged at a lower area of the housing 199 of the medicine dispensing apparatus 200, and the other one of the pair of drawers 80 is arranged at a middle area of the housing 199 of the medicine dispensing apparatus 200. In the case of the medicine dispensing apparatus 200 as illustrated in FIG. 1A and FIG. 1B, twenty cartridges 10 (4×5=20) are placed and held in one of cartridge trays 20 of one of the pair of drawers 80, as will be described later in detail with reference to FIG. 7.

For the sake of explanatory convenience, each one of the multiple drawers 80 may be referred to as the cartridge tray 20 in the following description.

Each of the multiple cartridges 10 is placed and housed in a partitioned lattice-like side wall and bottom wall in the cartridge tray 20. On the bottom wall of the cartridge tray 20 of corresponding ones of the multiple cartridges 10, a rectangular through opening 21 through which a pack can be picked up from below one of the multiple cartridges 10, making use of the elasticity or free deformation of the pack as will be described later in detail in relation to the operation, is formed as will be described later in detail with reference to FIG. 7.

The drawer 80 according to the present embodiment can align and hold the cartridge tray 20. In other words, a pair of slide rails 81 are attached to the outer side wall of the drawer 80, and a rail of the housing 199 is disposed on the housing 199 so as to be fitted to the slide rails 81 of the drawer 80. Due to such an engagement between the rail of the housing 199 and the slide rail 81, the drawer 80 in which one of the multiple cartridge trays 20 is stored and held can be pulled out from the housing 199.

Each one of the multiple medicine dispensing trays 30 serves as a medicine dispenser in which the prescribed packs conveyed by the conveyance unit 90 are arranged. As illustrated in FIG. 1A and FIG. 1B, a pair of medicine dispensing trays 30 are arranged above the multiple cartridges 10 mounted on the cartridge tray 20 in the uppermost one of the multiple drawers 80. The position of each one of the multiple medicine dispensing trays 30 where the packs are passed to the medicine dispensing tray 30 for automatic medicine dispensing is referred to as a medicine dispending position 29 in the following description.

The carriage 50 according to the present control sample of the embodiments of the present disclosure serves as a pickup device that picks up a specific pack from one of the multiple cartridges 10.

The conveyance unit 90 according to the present embodiment serves as a conveyor that conveys the pack picked up from one of the multiple cartridges 10 by the carriage 50.

Each one of the first gate 41 and the second gate 42 according to the present embodiment serves as an entrance and exit gate for the container, which allows one of the multiple cartridges 10 and the cartridge tray 20 to enter and exit the housing 199 through the drawer 80. The multiple cartridges 10 are inserted and set in the housing 199 through each one of the first gate 41 and the second gate 42. The open and close door of one of the first gate 41 and the second gate 42 are opened, and the drawer 80 in which the multiple cartridge trays 20 are aligned is drawn out to the front side. By so doing, the multiple cartridges 10 or the multiple cartridge trays 20 are inserted or withdrawn.

The third gate 43 and the fourth gate 44 according to the present control sample of the embodiments of the present disclosure serve as a pair of entrance and exit gates for the medicine dispenser, which allow the multiple medicine dispensing trays 30 that are arranged in two rows at the uppermost stage of the medicine dispensing apparatus 200 to enter and exit the housing 199. The third gate 43 and the fourth gate 44 are arranged such that the packs can be taken out immediately after the packs are set or inserted into the medicine dispensing tray 30.

In the medicine dispensing apparatus 200 according to the present embodiment, two medicine dispensing trays 30 are arranged as described above, and as will be described later in detail, a plurality of medicine dispensing trays 30 are arranged for each time of medication such as a time in the morning, a time in the daytime, a time in the evening, and a time before going to bed.

The third gate 43 and the fourth gate 44 for the medicine dispensing tray 30 are also arranged for each one of the medicine dispensing trays 30. Due to such a configuration, another different one of the medicine dispensing trays 30 can be taken out even when the medicine dispersing operation is performed on a particular one of the multiple medicine dispensing trays 30.

In a lower portion of the medicine dispensing apparatus 200, a saving unit 40 is arranged to which a pack is saved on a temporary basis until the pack is returned to a correct position of the medicine dispensing tray 30. Such saving takes place, for example, when the medicine package 2 picked up from one of the multiple cartridges 10 is a wrong package and not to be placed in the medicine dispensing tray 30.

The multiple cartridge trays 20 according to the present embodiment as illustrated in FIG. 1A and FIG. 1B are collectively arranged in upper and lower stages below the multiple medicine dispensing trays 30 arranged uppermost. However, no limitation is intended thereby, and the multiple cartridge trays 20 according to the present embodiment as illustrated in FIG. 1A and FIG. 1B may collectively be arranged on an upper side or may collectively be arranged on a lower side. Depending on the number of persons in the day-care center or nursing home or day-care center, the multiple cartridge trays 20 may be arranged in three stages. Such an alternative embodiment may be adopted without affecting the effects to be achieved by the embodiments of the present disclosure.

An outline of the medicine package 2 according to the present embodiment is described below with reference to FIG. 2A, FIG. 2B, FIG. 2C, and FIG. 2D.

Figures 2A, 2B, 2C, 2D:
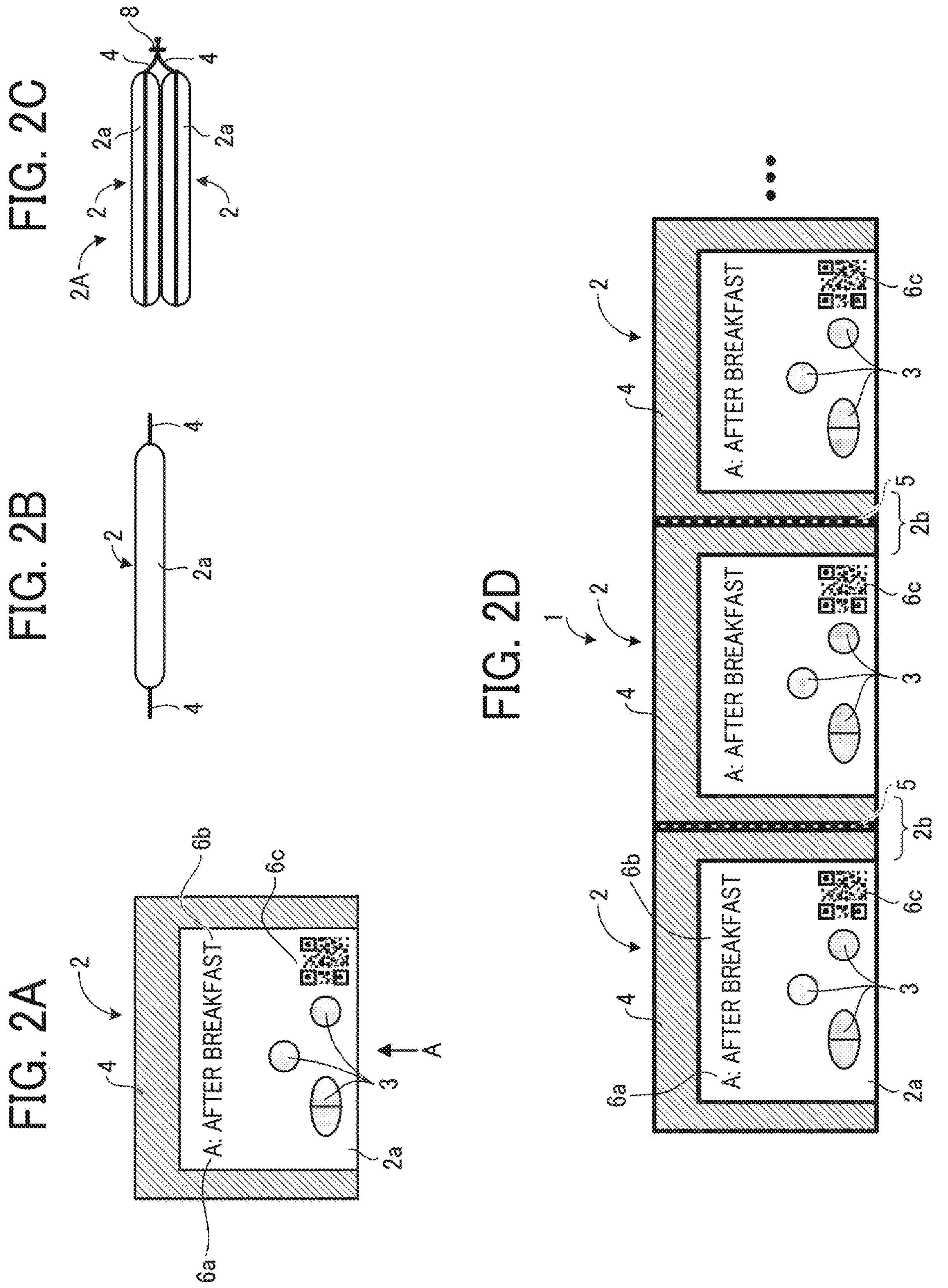
FIG. 2A is a plan view of a single medicine package according to an embodiment of the present disclosure.
FIG. 2B is a side view of the single medicine package of FIG. 2A viewed in a direction indicated by an arrow A, according to an embodiment of the present disclosure.
FIG. 2C is a side view of a bound medicine package according to an embodiment of the present disclosure.
FIG. 2D is a view of a typical form of continuous packs according to an embodiment of the present disclosure.

FIG. 2A is a typical plan view of a single medicine package 2 according to the present embodiment.

FIG. 2B a side view of the single medicine package 2 of FIG. 2A viewed in a direction indicated by an arrow A, according to the present embodiment.

FIG. 2C is a side view of the bound medicine package 2A in which the multiple medicine packages 2 are stacked on top of each other in layers, according to the present embodiment.

FIG. 2D is a view of a typical form of continuous packs 1 according to the present embodiment.

The medicine pack according to the present embodiment includes, for example, the single medicine package 2 and the bound medicine package 2A in which a plurality of medicine packages 2 are stacked on top of each other in layers and bound by a stapler or the like. In FIG. 2C, two medicine packages 2 are bound as the bound medicine package 2A. The bound medicine package 2A according to the present embodiment may be referred to simply as a bound package 2A in the following description. Except for FIG. 2A, FIG. 2B, FIG. 2C, and FIG. 2D, a single medicine package 2 is illustrated. However, as a matter of course, the bound medicine package 2A is also included even when only a single medicine package 2 is illustrated.

As illustrated in FIG. 2A, one medicine package 2 is formed of, for example, a resin film, and a plurality of medicines 3 such as capsules or tablets are packed in small quantities. Each one of the multiple medicine packages 2 according to the present embodiment includes a bag 2*a* that covers the medicines 3 and a pressure-bonded portion 4. The pressure-bonded portion 4 is hatched in FIG. 2A and FIG. 2D, where three sides of the bag 2*a* are pressure-bonded or welded. Typically, the side of the medicine package 2 on the bag 2*a* side is folded into two, and the medicines 3 are packed therebetween. The pressure-bonded portion 4 forms a leakage preventing portion that prevents the medicines 3 from slipping out from the bag 2*a*. Typically, the medicines 3 in one medicine package 2 is a one-time dosage for a patient who takes medicines.

The medicine package 2 is prepared by a drug-dispensing machine installed in a pharmacy or the like. The dispensing sheets that serve as packages and are used for dispending the medicines are rolled long-length sheets, and are perforated between packs. The dispensing sheets are rolled in an overlapping manner, and the medicines 3 to be taken are packed in the space between the sheets. The medicines 3 for a required number of doses are divided in small quantities, and packed into the multiple medicine packages 2 that form a continuous sheet. The three sides other than the folded portion of each one of the multiple medicine packages 2 around the medicines 3 for a single dose are sealed in turn by the pressure-bonded portion 4. The multiple medicine packages 2 that form such a continuous sheet may be referred to as continuous packs 1 in the following description. In the continuous packs 1 that are described with reference to FIG. 2D, the multiple medicine packages 2 are coupled to each other and laid like a belt. In the present embodiment described with reference to FIG. 2D, the medicines 3 for three doses are illustrated. The continuous packs 1 are typical form of drug or medicine that is given or sold at a pharmacy or the like to, for example, a user such as a person who actually takes the medicine 3 in the medicine package 2 and a personal care attendant or assistant who helps or assists the user to take medication, or a staff or the like including a pharmacist, a nurse practitioner, a care manager, or a medication assistant of, for example, various kinds of day-care center, nursing home, or medical institution. For the sake of explanatory convenience, each one of the packs is filled with the medicines 3 of the same form in the following description of the present disclosure. In FIG. 2C, by way of example, each one of the packs is filled with the same capsule and the same tablets. However, no limitation is indicated thereby. As a matter of course, each one of the packs may be filled with different type of medicines depending on, for example, the usage or purposes of the medication.

In the present embodiment described with reference to FIG. 2A, FIG. 2B, FIG. 2C, and FIG. 2D, the medicine package 2 has a rectangular shape in a plan view, and a packaging method in which three sides are crimped and sealed as in the present embodiment is called three-sided packaging in the related art. Most of the drug-dispensing machines available on the market make packs using the three-sided packaging method.

The pressure-bonded portion 4 has a band-like width of about 10 to 15 millimeters (mm), and has higher rigidity than the portion of the bag 2*a* that is a transparent or semitransparent film where the medicines 3 can be visually recognized therethrough. In the generation or dispensing by a drug-dispensing machine, a boundary portion 2*b* that is implemented by perforation 5 is formed in the center of the pressure-bonded portion 4 between a pair of the multiple medicine packages 2 making up the continuous packs 1. The multiple medicine packages 2 are adjacent to each other in an upstream-to-downstream direction. For example, a user who is not handicapped in the hand can obtain one medicine package 2 by tearing off at the perforation 5 by hand or by cutting near the perforation 5 with scissors or a dedicated cutter.

As illustrated in FIG. 2C, the bound medicine package 2A may be used. As illustrated in FIG. 2C, the bound medicine package 2A are formed by fastening a plurality of medicine packages 2 at the center of the three sides of the pressure-bonded portions 4 by stapling 8 or the like (see FIG. 2C). In FIG. 2C, two medicine packages 2 are fastened together. For example, the bound medicine package 2A may be formed by taping a plurality of packs together. Alternatively, the bound medicine package 2A may be, for example, packs of Chinese herbal medicines or sheets of blister packs that are combined together.

As medication-related information such as the name of a patient who takes medicines and the times of medication, the first medication-related information is added to the surface of the bag 2*a* of the medicine package 2. As the first medication-related information, medication-related information 6*a* in which the name of a patient who takes medicines such as the medicine 3 in the medicine package 2 is expressed in texts, medication-related information 6*b* in which the times of medication at which the medicine 3 is taken is expressed in texts, and medication-related information 6*c* in which the name of a patient who takes medicines and the times of medication are expressed by a quick response (QR) code (registered trademark) are added to the medicine package 2 as illustrated in FIG. 2A, FIG. 2B, FIG. 2C, and FIG. 2D.

The medication-related information 6*a* and 6*b*, which is textual information, and the medication-related information 6*c*, which is a Quick Response (QR) code (registered trademark), are added to the medicine package 2 as illustrated in FIG. 2A, FIG. 2B, FIG. 2C, and FIG. 2D. However, no limitation is intended thereby, and one of the textual information and the QR code may be added. Alternatively, for example, a radiofrequency identification (RFID) tag that is used when tag information is read using a bar code or short-range radio may be used.

Further, the first medication-related information may be, for example, the type of the medicine or the shape of the medicine prescribed in a pack, the number of tablets, and the images or texts printed on the medicine itself. As the first medication-related information, only individual information may be acquired and used, or a plurality of items of information may be acquired and used in combination. For example, if confirmation of the patient who takes medicines is required, the information of the patient who takes medicines is sufficient. If it is desired to prevent forgetting to take an important medicine, the information of the number of tablets of the medicine and the shape of the medicine in the pack is confirmed together with the information of the patient who takes medicines. In other words, the medication-related information includes at least one of the name of a patient who takes medicines, the times of medication at which the medicines in a pack are to be taken, and the number of tablets and types of the medicines prescribed in the pack.

The medicine dispensing tray 30 will be described below with reference to FIG. 3.

Figure 3:
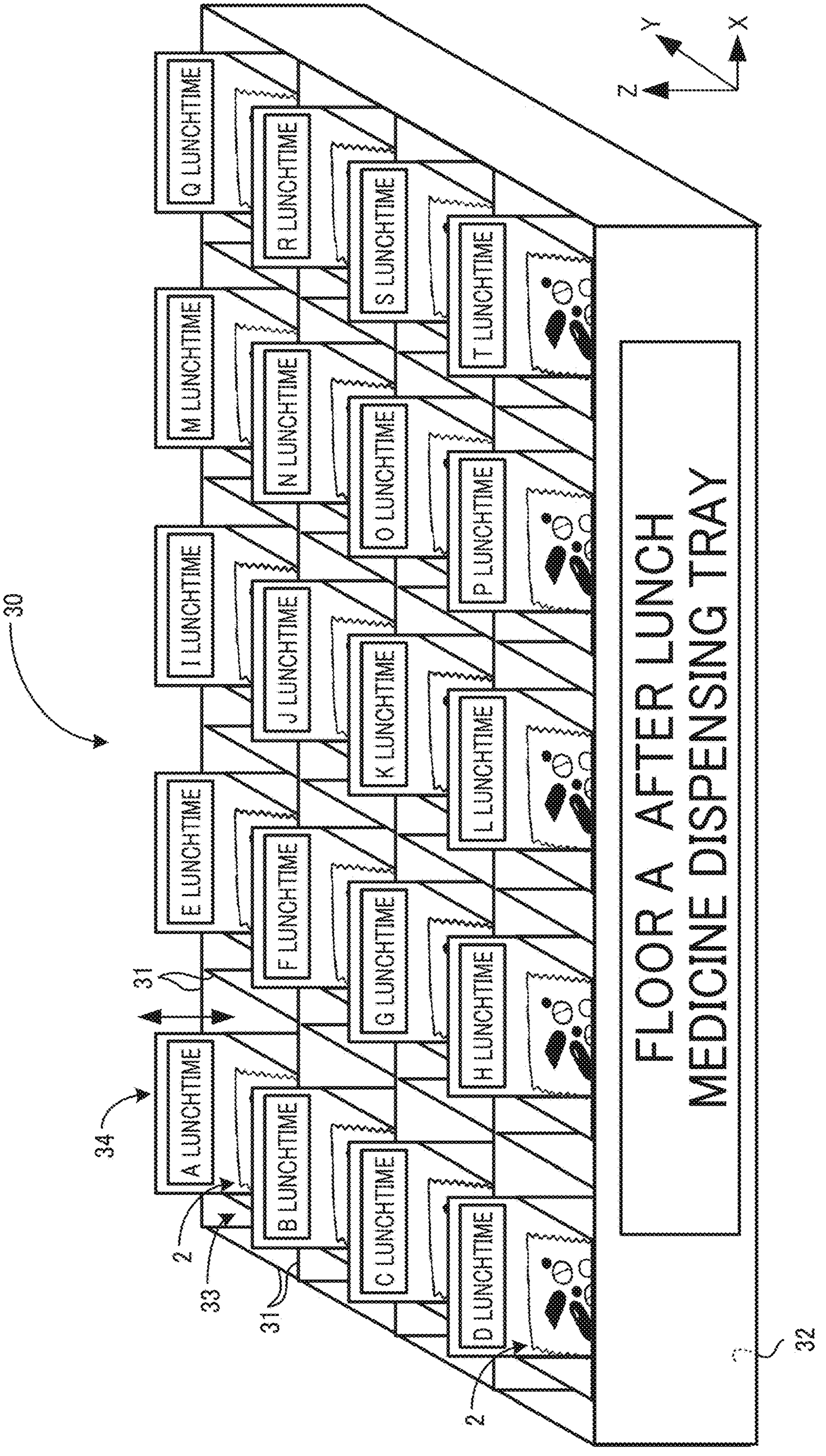
FIG. 3 is an external perspective view of a medicine dispensing tray, illustrating one configuration of the medicine dispensing tray, according to an embodiment of the present disclosure.

FIG. 3 is an external perspective view of the medicine dispensing tray 30, illustrating one configuration of the medicine dispensing tray 30, according to the present embodiment.

As illustrated in FIG. 3, each one of the multiple medicine dispensing trays 30 has a plurality of partition walls 31 that serve as a plurality of dividers for arranging prescribed packs, and is partitioned by four upright partition walls 31. The twenty partitions 33 that are formed in each one of the multiple medicine dispensing trays 30 can be expressed as the components of a matrix including five columns in the X-direction or the line feed direction and four rows in the Y-direction or the character feed direction. As a result, each one of the twenty partitions 33 of the multiple medicine dispensing trays 30 can be uniquely positioned based on the components and addresses of the matrix of five columns and four rows. Furthermore, each one of the multiple medicine dispensing trays 30 has a bottom wall 32 on which the multiple medicine packages 2 are placed. As described above, each one of the multiple medicine dispensing trays 30 are arranged such that a specific one of the multiple packs will be placed in a specific one of the multiple partitions 33 with reliability by the multiple partition walls 31, which are four partition walls in the present embodiment, and the bottom wall 32 in common, without being mixed up with packs in different one of the multiple partitions 33 or dropping off from the bottom wall 32.

In the medicine dispensing tray 30 as illustrated in FIG. 3, "FLOOR A AFTER LUNCH MEDICINE DISPENSING TRAY" displayed on the front outer wall indicates that the tray is the medicine dispensing tray 30 in which the multiple packs to be taken after lunch by a plurality of patients who take medicines and reside in the same floor A of, for example, a day-care center or nursing home are arranged. The same sets of medicines are to be taken after breakfast in the present embodiment, as indicated by the medication-related information 6*a* and 6*b* on the medicine package 2 as illustrated in FIG. 2A and FIG. 2D.

FIG. 3 illustrates one of the multiple medicine dispensing trays 30 where a subdivision box 34 attachable to and detachable from each one of the multiple partitions 33 is used. For example, the multiple subdivision boxes 34 according to the present embodiment hold the multiple medicine packages 2 filled with the medicines 3 to be taken by twenty residents A to T after lunch in day-care center or nursing home. In other words, one of the multiple medicine dispensing trays 30 illustrated in FIG. 3 is used to arrange prescribed packs in a predetermined or specific one of the multiple partitions 33 partitioned by a plurality of dividers through the multiple subdivision boxes 34. The operation of placing the multiple medicine packages 2 in one of the multiple medicine dispensing trays 30 is briefly described later with a case in which the multiple subdivision boxes 34 are not used.

A label 7 with a quick response (QR) code (registered trademark) to be placed in one of the multiple subdivision boxes 34 used for the medicine dispensing tray 30 is described below with reference to FIG. 4A and FIG. 4B.

Figure 4A:
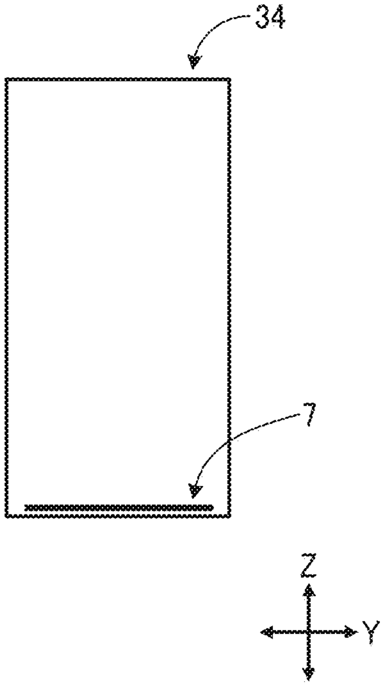
FIG. 4A is a diagram illustrating the attachment of a label with a quick response (QR) code (registered trademark) to be placed in a subdivision box, according to an embodiment of the present disclosure.

FIG. 4A is a diagram illustrating the attachment of the label 7 with a quick response (QR) code (registered trademark) to be placed in one of the multiple subdivision boxes 34 used for the medicine dispensing tray 30, according to the present embodiment.

Figure 4B:
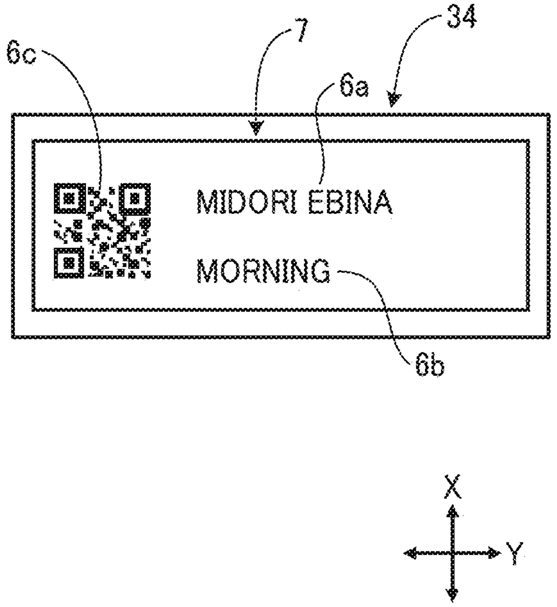
FIG. 4B is a diagram illustrating how a label with a QR code (registered trademark) is displayed, according to an embodiment of the present disclosure.

FIG. 4B is a diagram illustrating how the label 7 with a QR code (registered trademark) is displayed, according to the present embodiment.

In order to specify the place to which one of the multiple medicine packages 2 picked up from one of the multiple cartridges 10 is to be dispensed, a label 7 with QR code on which the medication-related information 6*a* that indicates the name of a patient who takes medicines, the medication-related information 6*b* that indicates the times of medication, and the medication-related information 6*c* are printed is pasted on the inner bottom face of one of the multiple subdivision boxes 34 of the medicine dispensing tray 30. The QR code (registered trademark) on the label 7 with QR code indicates the medication-related information 6*a* and the medication-related information 6*b*.

The QR code (registered trademark) of the label 7 with QR code is read by a lower QR code reader 67 as will be described later in detail with reference to FIG. 9A and FIG. 9B, and the coordinates of the X position and the Y position, which are the information about the position of the carriage 50, are linked to a quick response (QR) code (registered trademark) that indicates the name of a patient who takes medicines and the times of medication. By so doing, the pack that is picked up from one of the multiple cartridges 10 can be dispensed to a desired position. The label 7 with QR code may be directly attached to the subdivision box 34 in the form of a seal, or may be attached to a plate and arranged in the subdivision box 34.

A label 7 with QR code may be pasted to each one of the multiple partitions 33 of one of the multiple medicine dispensing trays 30, or a plate may be arranged when the subdivision box 34 is not to be used. With the use of the multiple subdivision boxes 34, the subdivision box 34 in which the multiple medicine packages 2 are stored can be picked up from the medicine dispensing tray 30, and a proper medicine package 2 can be moved under an occupant or patient who takes medicines. Accordingly, there is no worry about taking a wrong pack or dropping the pack.

In each one of the multiple partitions 33 of the multiple medicine dispensing trays 30, a setting position or inserting position is determined for each patient who takes medicines depending on a type of medicines in the pack to be taken. In other words, the multiple partitions 33 in one of the multiple medicine dispensing trays 30 may be allocated to a plurality of patients who take medicines at the same time. In a case where a specific patient who takes medicines does not take a medicine at a specific timing, arrangement can be made such that a pack is not given to such a specific patient at the specific timing.

However, no limitation is intended by the multiple medicine dispensing trays 30 described above. According to an alternative embodiment of the present disclosure, each one of the multiple partitions 33 of one of the multiple medicine dispensing trays 30 may be allocated for each time of medication of each patient who takes medicines. More specifically, in such an alternative embodiment of the present disclosure, the multiple partitions 33 may be allocated to each of the patients who take medicines in view of the time of medication of each one of the multiple medicine packages 2 to be taken in the morning, in the daytime, in the evening, or before going to bed. In the multiple medicine dispensing trays 30 according to such an alternative embodiment of the present disclosure, the multiple medicine dispensing trays 30 may be managed on a room by room basis or a floor by floor basis in day-care center or nursing home where a plurality of patients who take medicines reside, and the multiple medicine packages 2 for that day or a couple of days may be dispersed in advance to the multiple medicine dispensing trays 30.

According to the above alternative embodiment, allocating the partitions 33 based on each time of medication such as a time in the morning, a time in the daytime, a time in the evening, and a time before going to bed can prevent the time of medication from being mistaken by patients who take medicines. The configuration or structure of the multiple medicine dispensing trays 30 is not limited to the embodiments of the present disclosure described above, and various kinds of combination are theoretically possible between patients who take medicines and the timing at which the medicines are to be taken. However, such combinations may go beyond the scope of the present disclosure, the description of such combinations is omitted.

One of the multiple cartridges 10 according to the present embodiment is described below with reference to FIG. 5A, FIG. 5B, FIG. 6A, and FIG. 6B.

Figure 5A:
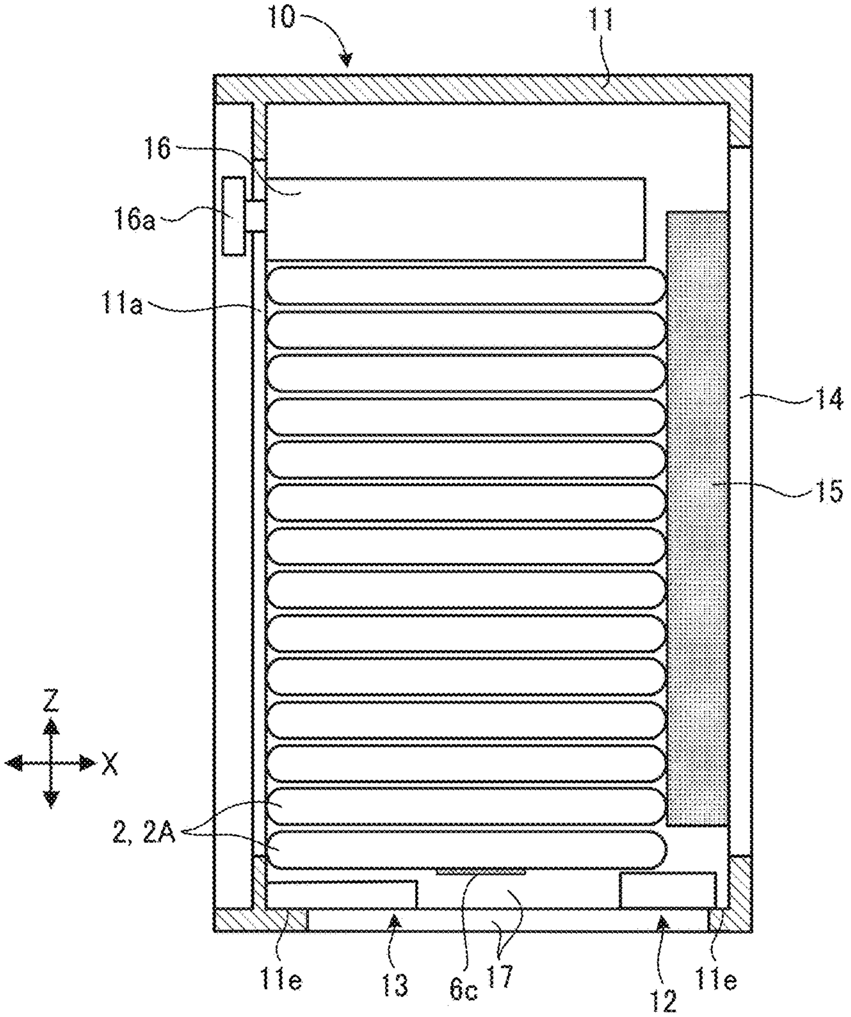
FIG. 5A is a vertical sectional view of a cartridge according to an embodiment of the present disclosure.

FIG. 5A is a vertical sectional view of one of the multiple cartridges 10 according to the present embodiment.

Figure 6A:
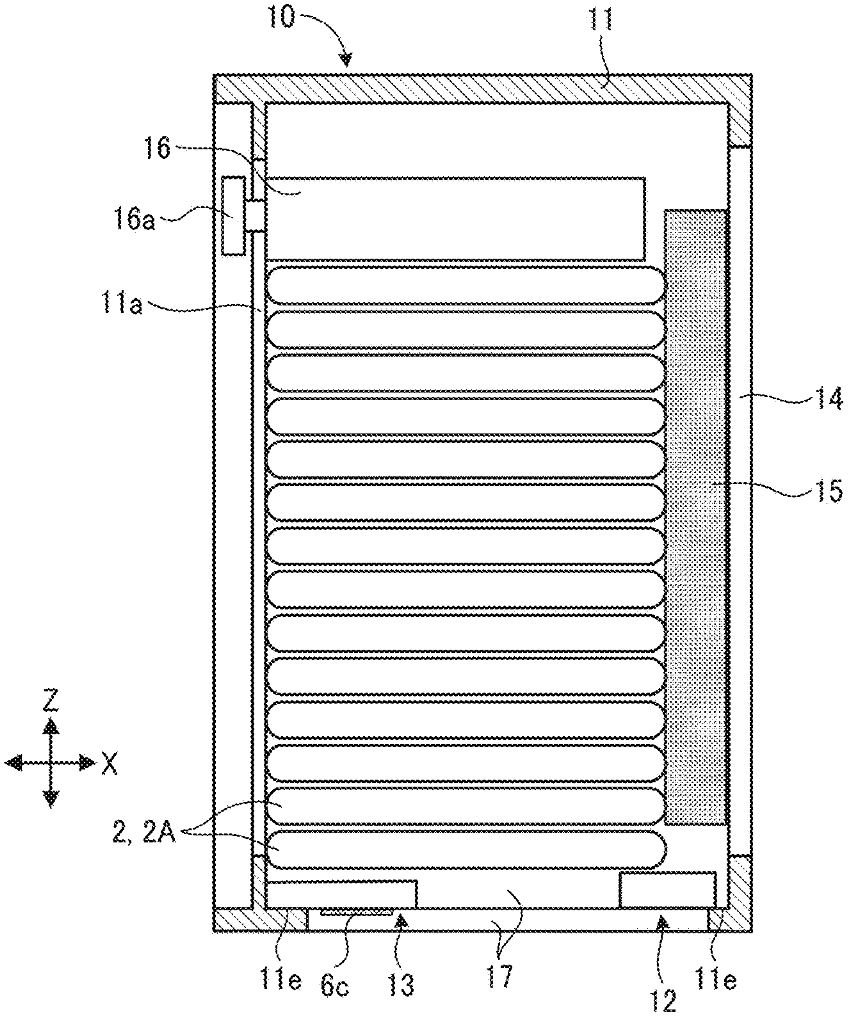
FIG. 6A is another vertical sectional view of a cartridge different from that of FIG. 5A, according to an embodiment of the present disclosure.

FIG. 6A is another vertical sectional view of one of the multiple cartridges 10 different from that of FIG. 5A, according to the present embodiment.

Figure 5B:
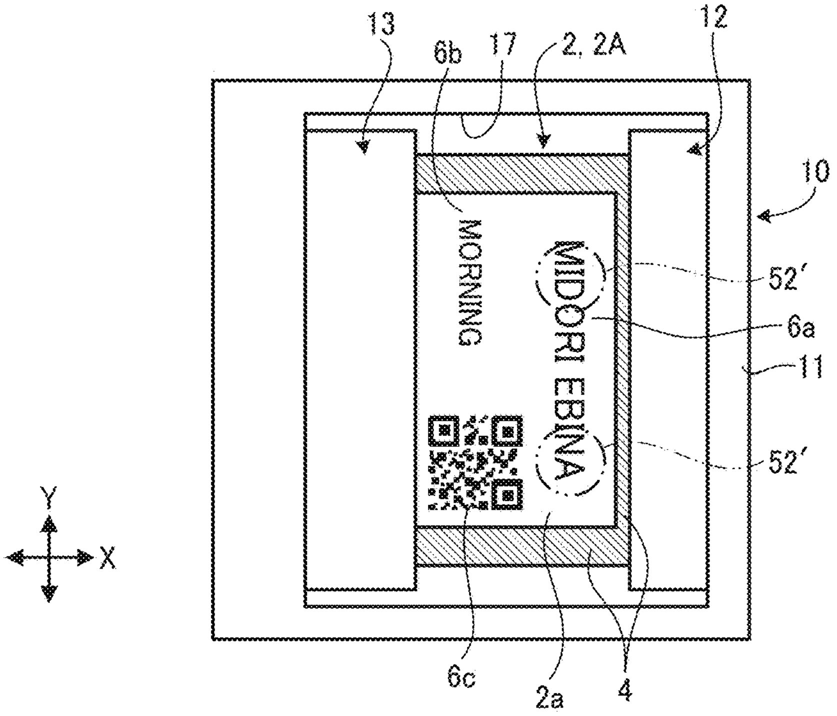
FIG. 5B is a bottom view of the cartridge of FIG. 5A, according to an embodiment of the present disclosure.

FIG. 5B is a bottom view of one of the multiple cartridges 10 of FIG. 5A, according to the present embodiment.

Figure 6B:
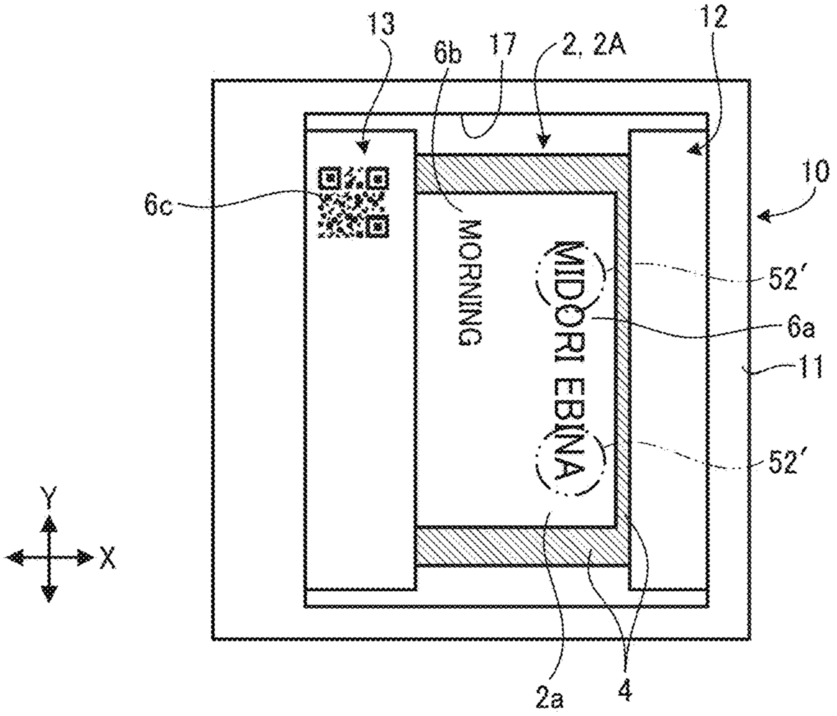
FIG. 6B is a bottom view of the cartridge of FIG. 6A, according to an embodiment of the present disclosure.

FIG. 6B is a bottom view of the cartridge 10 of FIG. 6A, according to the present embodiment.

In order to simplify the drawing, the illustration of the pressure-bonded portions 4 (see FIG. 2A, FIG. 2B, FIG. 2C, and FIG. 2D) of the multiple medicine packages 2 stored in one of the multiple cartridges 10 is omitted in the pair of vertical sections of FIG. 5A and FIG. 6A, and the medicine packages 2 are schematically illustrated in an enlarged and exaggerated manner. For the same purpose, the hatching of the cross sections of the supporters such as the right support portion 12 and the left support portion 13 is also omitted.

One of the multiple cartridges 10 as illustrated in FIG. 5A and FIG. 5B is equivalent to one of the multiple cartridges 10 as illustrated in FIG. 6A and FIG. 6B in terms of, for example, the shape. One of the multiple cartridges 10 as illustrated in FIG. 5A and FIG. 5B is different from one of the multiple cartridges 10 as illustrated in FIG. 6A and FIG. 6B in terms of the position at which the QR code (registered trademark) that indicates the medication-related information 6*c* is displayed and the member on which the QR code (registered trademark) that indicates the medication-related information 6*c* is displayed. The configuration or structure in terms of, for example, the shape is described with reference to FIG. 5A and FIG. 5B.

For example, each one of the multiple cartridges 10 according to the present embodiment includes a casing 11, a lid 14, a pack pickup slot 17, a movable board 16, a pack posture keeper 15, and a right support portion 12 and a left support portion 13 each of which serves as a support portion.

The casing 11 according to the present embodiment stores, for example, a plurality of medicine packages 2 or a plurality of bound medicine packages 2A. In the following description, a single medicine package 2 will represent such a plurality of medicine packages 2 or a plurality of bound medicine packages 2A. For example, the casing 11 is integrally or separately formed using resin. The lid 14 according to the present embodiment enables the multiple medicine packages 2 to be loaded or unloaded. The pack pickup slot 17 according to the present embodiment is formed in a lower portion or a bottom portion of the casing 11, and is used to pick up the medicine package 2 in one of the multiple cartridges 10. Moreover, the pack pickup slot 17 according to the present embodiment allows the medicine package 2, which is picked up from one of the multiple cartridges 10 by the carriage 50 (see, for example, FIG. 1A, FIG. 1B, and FIG. 9A, and FIG. 9B), to pass therethrough.

The movable board 16 according to the present embodiment prevents the medicine package 2 from falling out, and makes the lowermost one of the multiple medicine packages 2 move close to the pack pickup slot 17 after the first one of the maximum number of medicine packages 2 that can be stored in the casing 11 is picked up. The pack posture keeper 15 keeps the posture of the medicine package 2. The right support portion 12 and the left support portion 13 also support or hold the medicine package 2 in the casing 11.

In the present embodiment, the to-be-picked-up portion of one of the multiple medicine packages 2 to be picked up from one of the multiple cartridges 10 by the carriage 50 is at a lower portion or bottom portion of the corresponding one of the multiple cartridges 10. In other words, the to-be-picked-up portion includes the pack pickup slot 17, and the right support portion 12 and the left support portion 13 that serve as a pair of support portions or supporting member and support, at a plurality of points, one of the multiple medicine packages 2 to be picked up from one of the multiple cartridges 10.

The right support portion 12 and the left support portion 13 according to the present embodiment are configured to allow one of the multiple medicine packages 2 to pass through when one of the multiple medicine packages 2 is picked up from one of the multiple cartridges 10 by the carriage 50. On the other hand, when any one of the multiple medicine packages 2 is not to be picked up from one of the multiple cartridges 10, the multiple medicine packages 2 are to be stored and held in the casing 11. In order to achieve that, the right support portion 12 and the left support portion 13 are configured to restrict the passage of one of the multiple medicine packages 2

As described above, the right support portion 12 and the left support portion 13 according to the present embodiment serve as a pair of support portions that support or hold the multiple medicine packages 2 in the one of the multiple cartridges 10, and each one of the right support portion 12 and the left support portion 13 is fixed and immovable such that one of the multiple medicine packages 2 can be picked up in a stable manner from one of the multiple cartridges 10 by the carriage 50. The right support portion 12 and the left support portion 13 according to the present embodiment are a pair of fixation members that are fixed or attached to the pair of bottom-wall inner surfaces 11*e* of the right bottom-wall edge and left bottom-wall edge of the pack pickup slot 17, respectively. The pack pickup slot 17 according to the present embodiment has both a function to allow the suction pad 52 of the carriage 50, as will be described later in detail with reference to, for example, FIG. 9A and FIG. 9B, to pass therethrough in order to pick up one of the multiple medicine packages 2 and a function to allow the picked-up medicine package 2 and the suction pad 52 to pass therethrough. In other words, the pack pickup slot 17 and the above right bottom-wall edge and left bottom-wall edge that are arranged so as to surround the pack pickup slot 17 together serve as a pack passing-through portion according to the present embodiment.

In one of the multiple cartridges 10 illustrated in FIG. 5A and FIG. 5B, a pair of positions 52' at which the pair of suction pads 52 (as will be described later in detail with reference to FIG. 11C) adsorb or suck up one of the multiple medicine packages 2 stored in one of the multiple cartridges 10 are indicated by a pair of ring-shaped dot-dot-dash lines as illustrated in FIG. 5B. Such a pair of positions may be referred to as a pair of suction pad positions in the following description. The right support portion 12 and the left support portion 13 support the multiple medicine packages 2 in one of the multiple cartridges 10 such that the multiple medicine packages 2 in one of the multiple cartridges 10 do not fall off from the pack pickup slot 17. As will be described later in detail in regard to the operation of the carriage 50, the right support portion 12 and the left support portion 13 have a positional relation in which one of the multiple medicine packages 2 is sucked by the pair of suction pads 52 at two suction pad positions in the Y-direction near both ends of the right support portion 12 when the lowermost one of the multiple medicine packages 2 in one of the multiple cartridges 10 is picked up while being sucked by the pair of suction pads 52. When the lowermost one of the multiple medicine packages 2 is picked up from one of the multiple cartridges 10 by the pair of suction pads 52, the pair of suction pads 52 passed near both ends of the right support portion 12 in the Y-direction to suck and hold one of the multiple medicine packages 2.

As illustrated in FIG. 5A and FIG. 5B, two points at which the suction pad 52 contacts are arranged near both ends of the right support portion 12 in the Y-direction. Due to such a configuration, the possibility of an error in which the suction by the pair of suction pads 52 is disabled can be avoided and prevented, and the picking up operation can successfully be done. In other words, as both ends of the multiple medicine packages 2 in the Y-direction are sucked by the pair of suction pads 52, the bag 2*a* of the medicine package 2, which is made of film, is stretched and can withstand the deformation. Accordingly, both reliable support or holding of the multiple medicine packages 2 in one of the multiple cartridges 10 and smooth removal of one of the multiple medicine packages 2 can be achieved.

The pack posture keeper 15 is formed of sponge rubber having appropriate elasticity. The movable board 16 is made of, for example, resin or metal. The pack posture keeper 15 and the movable board 16 according to the present embodiment hold the posture of the multiple medicine packages 2 under normal operating conditions in the casing 11. As explicitly illustrated in FIG. 5A, the posture of the multiple medicine packages 2 is held orderly in the Z-direction in a substantially horizontal state. In order to achieve the above-described function, the movable board 16 is arranged to move at least one of the multiple medicine packages 2 left in the casing 11 toward the pack pickup slot 17 as moving downward in the casing 11 in the Z-axis direction by its own weight.

As illustrated in FIG. 5A, a long groove 11*a* that extends in the Z-direction with predetermined width in the X-direction is formed in the side wall of the casing 11. A shaft 16*a* with a flange is arranged at one end of the movable board 16 so as to protrude from the long groove 11*a*. As the shaft 16*a* of the movable board 16 is guided in the Z-direction parallel to the long groove 11*a*, the posture of the multiple medicine packages 2 can be held in the Z-direction. In FIG. 5, the multiple medicine packages 2 in the multiple cartridges 10 are stacked on top of each other in layers in a substantially horizontal state. However, in actuality, left portions of the medicine packages 2 in FIG. filled with the medicines 3 are expanding.

A set of the multiple medicine packages 2 are orderly stored in the casing 11 toward the upper side from the pack pickup slot 17 on the right support portion 12 and the left support portion 13. The timing at which the multiple medicine packages 2 are supplied into one of the multiple cartridges 10 may be, for example, the timing at which a patient who takes medicines or occupant is examined in a day-care center or nursing home, which is typically once a two weeks, or the timing at which the multiple medicine packages 2 in one of the multiple cartridges 10 run out. When some medicine packages 2 are left in one of the multiple cartridges 10 at the time of replenishment, such replenishment is continued from the back of the remaining medicine packages 2.

Under normal operating conditions, the above-described setting of the multiple medicine packages 2 into one of the multiple cartridges 10 and the replenishment of the multiple medicine packages 2 are done by a staff or the like in a day-care center or nursing home. However, no limitation is indicated thereby. In particular, in configurations where cartridges are used instead of containers and setting or replenishment of the medicine packages 2 are done automatically, the setting or replenishment of the medicine packages 2 may be done differently.

The lid 14 is used by a staff or the like who works at a day-care center or nursing home to enable loading or unloading of the multiple medicine packages 2 stored in one of the multiple cartridges 10, and as illustrated in FIG. 5A, is formed with wide length in the Z-direction of the casing 11 and has a predetermined opening width.

As illustrated in FIG. 5B, the types of the multiple medicine packages 2 in one of the multiple cartridges 10 are sorted or divided based on the timings at which medicines are taken. For example, one cartridge contains medicines to be taken in fourteen days in the morning by, for example, Midori Ebina (Ms. A). In view of the above circumstances, if Ms. Midori Ebina (A) takes the medicines not only in the morning but also in the daytime or in the evening, or before going to bed, four cartridges 10 are required in total. However, no limitation is indicated thereby. For example, in an alternative embodiment of the present disclosure, a single cartridge 10 may be prepared for each person or patient who takes medicines. In such cases, for example, a pack to be used in the morning on day one, a pack to be used at lunchtime on day one, a pack to be used in the evening on day one, a pack to be used before going to bed on day one, a pack to be used in the morning on day two, a pack to be used at lunchtime on day two, and a pack to be used in the evening on day two may be stored in the order listed upward from the pack pickup slot 17 parallel to the direction in which packs are taken out from the multiple cartridges 10.

Some technologies have been proposed for a combination between a left flap portion and a right flap portion of the flap mechanism. Such a left flap portion is provided with a helical torsion coil spring having pressing force within a predetermined range between the rotation axis and the right bottom-wall edge, and such a right flap portion is openable and closable and can swing about a rotation axis arranged around the right bottom-wall edge of the pack pickup slot. However, the pack tends to be caught and clamped between the left flap portion or the right flap portion and the bottom-wall inner surface of the pack pickup slot when the pack is picked up from one of the cartridge that serves as a container, and the operation of picking up the medicine package is unstable.

In order to deal with the above technical problems, in some embodiments of the present disclosure, the right support portion 12 and the left support portion 13 are fixed to the bottom-wall inner surface 11*e* of the pack pickup slot 17 of the casing 11 such that one of the multiple medicine packages 2 can be picked up in a steadily stable manner from one of the multiple cartridges 10 by the carriage 50.

In other words, the right support portion 12 and the left support portion 13 according to the present embodiment are fixed when the right support portion 12 and the left support portion 13 hold both ends of the medicine pack such as the medicine package 2 or the bound medicine package 2A around the pack pickup slot 17 arranged at the lower portion of one of the multiple cartridges 10.

An end of the bottom one of the multiple medicine packages 2 to be adsorbed by, for example, an adsorption system is supported by the right support portion 12, and the other end of the bottom one of the multiple medicine packages 2 is supported by the left support portion 13. Due to such a configuration, the medicine packages 2 that are set and stored in one of the multiple cartridges 10 do not drop. The right support portion 12 and the left support portion 13 are different in the length of the portion that support the multiple medicine packages 2, and the length of portion of the right support portion 12 that support the multiple medicine packages 2 is shorter than that of the left support portion 13. When the lowermost one of the multiple medicine packages 2 stored in one of the multiple cartridges 10 is adsorbed or sucked by the suction pad 52 and is from the cartridge 10, the medicine pack such as the medicine packages 2 is bent or freely deformed due to its elasticity. Accordingly, the medicine pack can easily be pulled out. Such a configuration and operation is described later in detail with reference to FIG. 11C.

In such a configuration, the pair of support portions including the right support portion 12 and the left support portion 13 are of fixed type. Accordingly, the front end of the next one of the multiple medicine packages 2 to be taken out can be reliably held and does not jump out or fall off together with one of the multiple medicine packages 2 that is being taken out. As the pair of support portions including the right support portion 12 and the left support portion 13 do not swing or rotate, the medicine package 2 are held with high stability with no deformation or the like due to unintentional nipping or pressing in the returning operation.

As illustrated in FIG. 5A and FIG. 5B, the medication-related information 6*a*, 6*b*, and 6*c* that are displayed on a medicine pack such as the medicine package 2 or the bound medicine package 2A are exposed through the pack pickup slot 17 of one of the multiple cartridges 10. The medication-related information 6*c* of the medicine pack can be read by a QR code reader mounted on the carriage 50, as will be described later in detail with reference to FIG. 9A and FIG. 9B. In order to simplify the drawing, in the embodiment described with reference to FIG. 5A and FIG. 5B, the medication-related information 6*c* is displayed only on, for example, the medicine package 2 or the bound medicine package 2A that is stored at the bottom of one of the multiple cartridges 10. However, as a matter of course, the medication-related information 6*c* is displayed on, for example, all the medicine packages 2 or bound medicine packages 2A that are stored in one of the multiple cartridges 10.

For example, when a drug-dispensing machine that makes, for example, the medicine package 2 cannot print a QR code (registered trademark) and the medication-related information 6*c* such as a QR code (registered trademark) cannot be applied to a medicine pack such as the medicine package 2 or the bound medicine package 2A, the QR code may be arranged as illustrated in FIG. 6A and FIG. 6B. In other words, as illustrated in FIG. 6A and FIG. 6B, the label 7 with QR code (registered trademark) that indicates the medication-related information 6*c* is pasted to the bottom face of the left support portion 13 close to the pack pickup slot 17. As a result, the medication-related information 6*c* of the medicine pack such as the bound medicine package 2 or the bound medicine package 2A that is stored in one of the multiple cartridges 10 can be obtained. In order to obtain the medication-related information 6*c*, texts or images may directly be printed on any one of the multiple cartridges 10 instead of pasting the label 7 with QR code (registered trademark).

The attaching and detaching mechanisms and operations of the multiple cartridges 10 that are arranged in the drawer 80 are described below with reference to FIG. 7 and FIG. 8.

Figure 7:
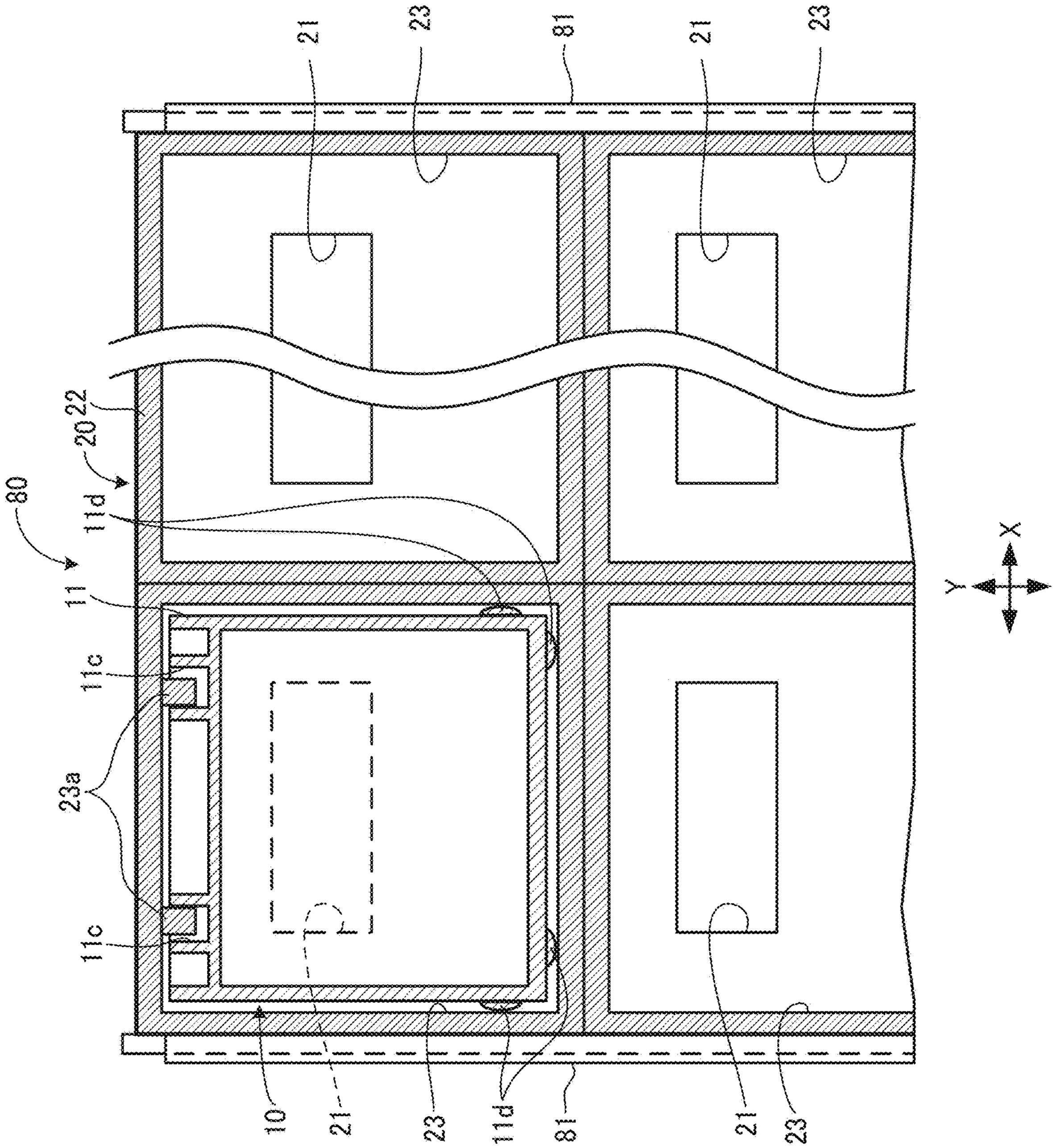
FIG. 7 is a schematic plan sectional view of the attaching and detaching mechanisms for the cartridge, which are arranged on a drawer, according to an embodiment of the present disclosure.

FIG. 7 is a schematic plan sectional view of the attaching and detaching mechanisms for the cartridge 10, which are arranged on the drawer 80, according to the present embodiment.

Figure 8:
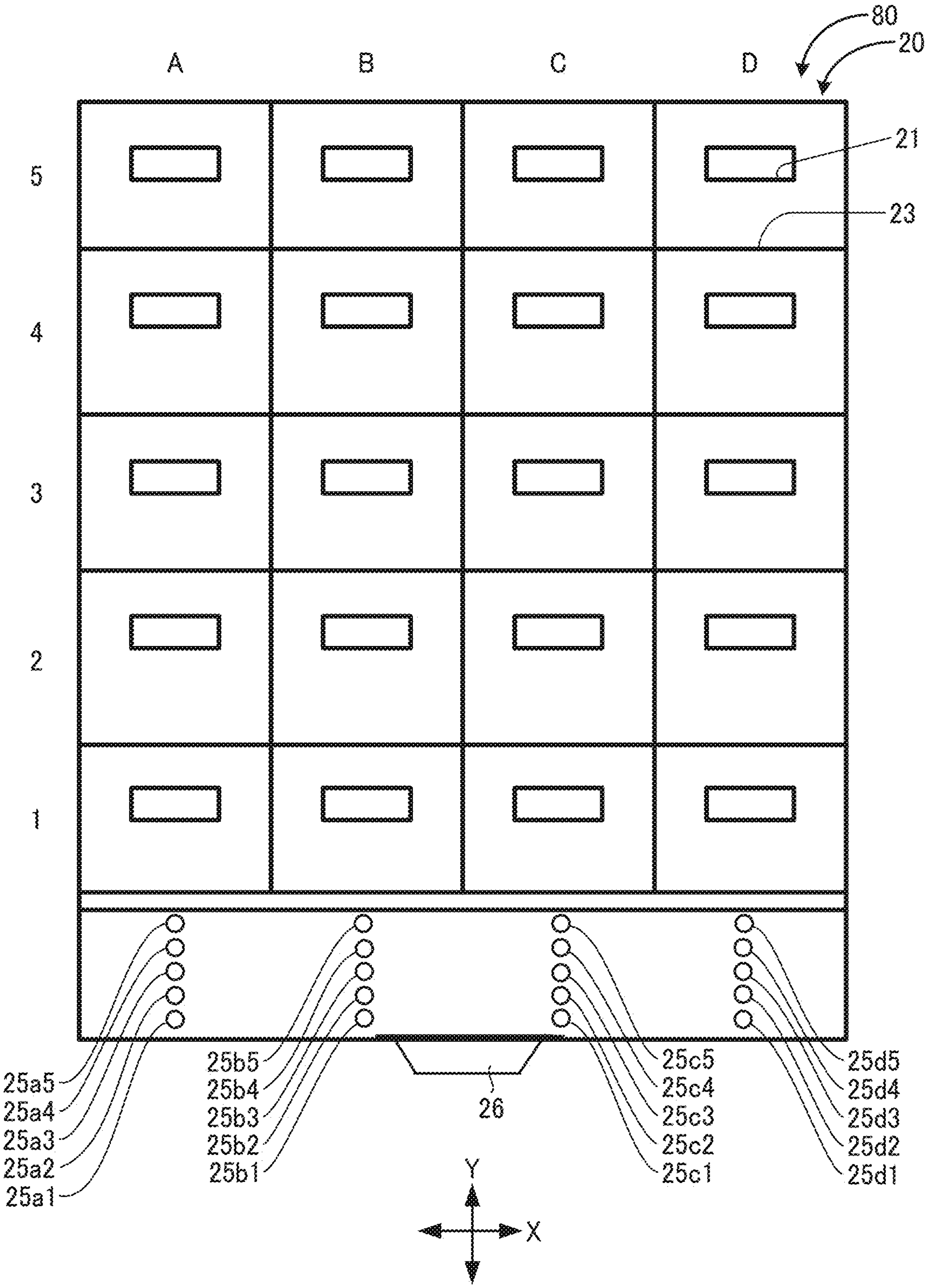
FIG. 8 is a schematic plan view of a drawer illustrating the mechanisms for recognizing a plurality of cartridges, which are arranged on the drawer, according to an embodiment of the present disclosure.

FIG. 8 is a schematic plan view of the drawer 80 illustrating the mechanisms for recognizing the cartridge 10, which are arranged on the drawer 80, according to the present embodiment.

As illustrated in FIG. 7, the drawer 80 according to the present embodiment is configured to allow the multiple cartridges 10 to be attachable and detachable through the cartridge tray 20. As known in the art, each one of the multiple cartridges 10 that is configured to be detachable as described above may be referred to as a container. The drawer 80 is integrally formed with the cartridge tray 20 to hold the cartridge tray 20. The casing 22 of the cartridge tray 20 in the drawer 80 is provided with a pair of slide rails 81 on the right and left outer side walls, respectively, and each one of the pair of slide rails 81 is slidable with one of the multiple rails provided for the housing 199 (see FIG. 1A and FIG. 1B). Due to such a configuration, the multiple cartridge trays 20 in the drawer 80 can be attached or detached by being pulled out from the housing 199 (see FIG. 1A and FIG. 1B) through the engagement between the slide rail 81 and the one of the multiple rails of the housing 199.

As illustrated in FIG. 7, one of the multiple cartridges 10 is attached to and detached from the cartridge tray 20 in the drawer 80 through the engagement and disengagement between a pair of concave portions 11*c* on the external wall of the casing 11 of the cartridge 10 and a pair of convex portions 23*a* that are formed on the inner wall of the casing 22 of the drawer 80 and protrude inwardly and the engagement and disengagement between the inner wall of the casing 22 and four hemispherical protrusions 11*d* on the external wall of the casing 11. With the above-described attaching and detaching mechanism of the drawer 80, the multiple cartridges 10 can be attached or detached easily and with good operability.

In the above embodiments of the present disclosure, attachment and detachment are enabled by the coupling or engagement of concave and convex portions. However, no limitation is intended thereby, and an elastic member may be arranged in the gap between the inner wall of the casing 22 and the external wall of the casing 11 to enable attachment and detachment. Alternatively, a configuration or structure using magnetic force or a snap-fit assembly method may enable attachment and detachment. As illustrated in FIG. 7 and FIG. 8, a rectangular through opening 21 that communicates with the pack pickup slot 17 of one of the multiple cartridges 10 as illustrated in FIG. 5A, FIG. 5B, FIG. 6A, and FIG. 6B when each one of the multiple cartridges 10 is attached to the each one of the multiple storage units 23 of the cartridge tray 20 is formed on the bottom wall of the cartridge tray 20 of the drawer 80.

As illustrated in FIG. 8, the cartridge tray 20 of the drawer 80 according to the present embodiment has a plurality of storage units 23 in which twenty cartridges 10 are stored. The storage unit 23 has four columns of A to D in the horizontal direction, and has five rows of 1 to 5 in the vertical direction. As illustrated in FIG. 8, the drawer 80 according to the present embodiment is provided with an information display device such as a plurality of light-emitting diodes (LEDs) 25*a*1 to 25*d*5 around a grip 26 that is held by hand to insert or withdraw the drawer 80. Due to such a configuration, the arrangement of the multiple cartridges 10 can easily be figured out. More specifically, due to such a configuration, at what position one of the multiple cartridges 10 in focus is placed in the cartridge tray 20 of the drawer 80 can easily be figured out at a glance. In FIG. 8, the light-emitting diode (LED) **25*a*1 is used to detect the presence or absence of one of the multiple cartridges 10 attached to or detached from a storage unit A1 of the cartridge tray 20. The storage unit A1 indicates a position or partition that is uniquely determined in the vertical columns and horizontal rows. In a similar manner to the above, the LED 25*a*2 corresponds to a portion of the storage unit A2 of the cartridge tray 20, and the LED 25*a*3 corresponds to a portion of the storage unit A3 of the cartridge tray 20. Moreover, the LED 25*a*4 corresponds to a portion of the storage unit A4 of the cartridge tray 20, and the LED 25*a*5 corresponds to a portion of the storage unit A5 of the cartridge tray 20. In a similar manner to the above, as illustrated in FIG. 8, each one of three columns of B to D and five rows of 1 to 5 of the multiple storage units 23 is provided with an LED that indicates whether one of the multiple cartridges 10, which is attached to and detached from one of the multiple storage units 23**, is present.

When a plurality of information display devices such as the multiple LEDs **25*a*1 to 25*d*5 are used, for example, a staff who is an operator to attach one of the multiple cartridges 10 to one of the multiple storage units 23 may mistake the lighting portion of the LEDs 25*a*1 to 25*d*5. In such cases, the cartridge 10 may erroneously attached to a wrong storage unit other than a desired one of the multiple storage units 23. In order to handle such a situation, for example, whether the cartridge 10 is present may electrically or automatically be recognized by arranging a plurality of detection units such as sensors or switches at the multiple storage units 23 in place of a plurality of information display devices such as the multiple LEDs 25*a*1 to 25*d*5**.

The container may be provided with for example, a number, a bar code, a quick response (QR) code (registered trademark), or a non-contact integrated circuit (IC) tag such that each one of the containers will be identifiable. It is desired that the system be programmed to remember what container stores whose medicines. Subsequently, the drawer 80 to which the multiple containers are attached is set in the housing 199 of the medication support device 300, and each one of the multiple containers is identified by the medication support device 300. Due to such a configuration, a desired pack can be picked up by the medication support device 300 without causing any errors.

A configuration, structure, and operation of the carriage 50 including a pickup unit and a pickup device are described below with reference to FIG. 9A to FIG. 12C.

Figure 9B:
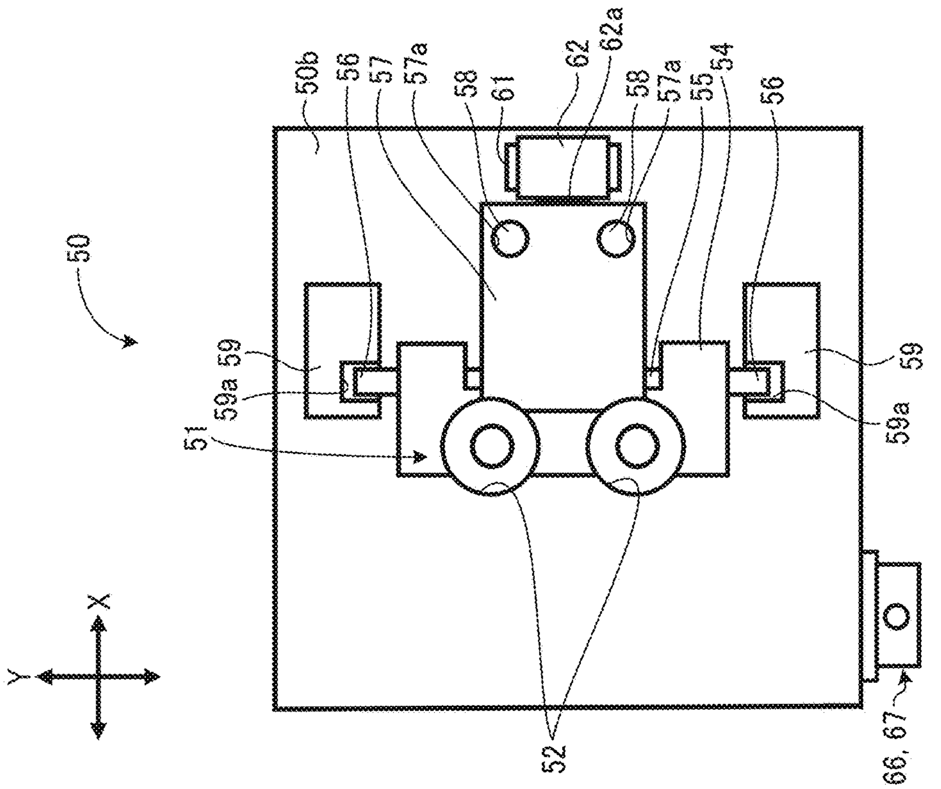
FIG. 9B is a plan view of the carriage of FIG. 9A, according to an embodiment of the present disclosure.
Figure 9A:
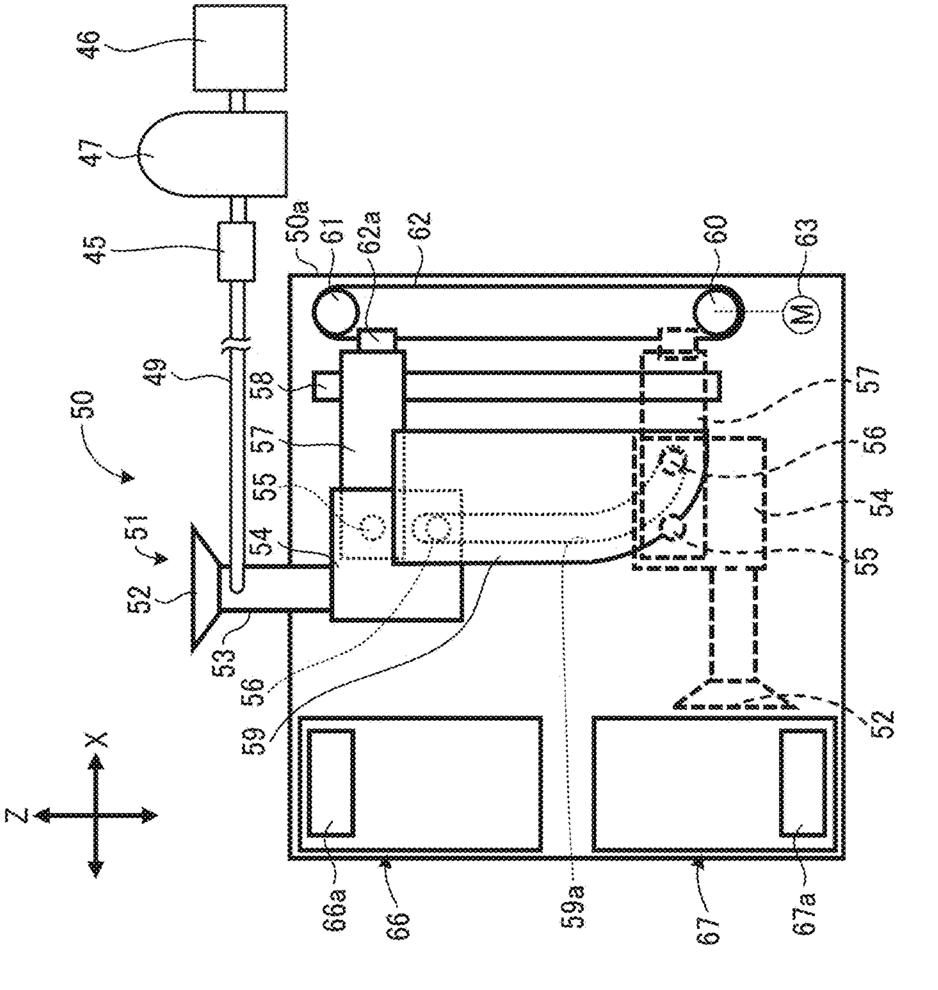
FIG. 9A is a front view of a carriage illustrating a schematic configuration or structure of the carriage, according to an embodiment of the present disclosure.

FIG. 9A is a front view of a carriage 50 illustrating a schematic configuration or structure of the carriage 50, according to the present embodiment.

FIG. 9B is a plan view of the carriage 50 of FIG. 9A, according to the present embodiment.

FIG. 10 to FIG. 12C are front views of the carriage 50 and illustrates the progression of the operation of the carriage 50, according to the present embodiment.

As illustrated in FIG. 9A and FIG. 9B, the carriage 50 according to the present embodiment includes a suction device 51 that picks up and holds one of the multiple medicine packages 2 from one of the multiple cartridges 10. The suction device 51 according to the present embodiment has a function to such up and separate the medicine package 2. When the medicine package 2 is to be sucked up, the suction device 51 according to the present embodiment has a function to suck up the medicine package 2 using the air under negative pressure generated by the negative-pressure generator 45 that serves as a switching unit between positive pressure and negative pressure. The suction device 51 according to the present embodiment has a function to separate the medicine package 2 using the pressurized air generated by the negative-pressure generator 45 when the medicine package 2 is to be separated.

As illustrated in FIG. 9A, the suction device 51 as described above sucks up one of the multiple medicine packages 2 as the negative-pressure generator 45 transforms the positive pressure generated by an air compressor 46 that serves as an air compressing means into negative pressure through an air tank 47. The air compressor 46 according to the present embodiment is installed outside the conveyance unit 90, and is coupled to the suction device 51 through the air tank 47 and the negative-pressure generator 45 by a communicating member such as an air tube 49. In the air tube 49 between the negative-pressure generator 45 and the suction device 51, a pressure sensor that measures the negative pressure is arranged to determine that the suction device 51 has sucked up one of the multiple medicine packages 2 when the negative pressure measured by a pressure sensor that measures the negative pressure becomes equal to or less than a predetermined value.

The air tube 49 according to the present control sample of the embodiments of the present disclosure is arranged together with, for example, a pair cable and a wire harness so as not to be stretched even when the carriage 50 moves inside the medicine dispensing apparatus 200. In other words, as illustrated in FIG. 1A and FIG. 1B, the air tube 49 according to the present control sample of the embodiments of the present disclosure has a one-turn path for each one of the X-axis, the Y-axis, and the Z-axis. Firstly, the air tube 49 according to the present embodiment is extended from the negative-pressure generator 45 in the Z-axis direction, and makes one turn. Secondly, the air tube 49 is extended in the X-axis direction, and makes one turn. Finally, the air tube 49 is extended in the Y-axis direction and makes one turn, and is coupled to the suction device 51.

The suction device 51 according to the present embodiment has a suction pad 52 that sucks one of the multiple medicine packages 2, and a suction duct 53 coupled to the suction pad 52. The negative-pressure generator 45 is also called a vacuum ejector valve and communicates with the suction duct 53 through the air tube 49. The suction pad 52 according to the present embodiment serves as an air suction unit or a suction member that sucks up and picks up one of the multiple medicine packages 2 in one of the multiple cartridges 10. As described above, the upper ends of the pair of suction pads 52 as illustrated in FIG. 9A is arranged to absorb one of the multiple medicine packages 2. The bottom ends of the pair of suction pads 52 as illustrated in FIG. 9A is attached and fixed to the upper end of the suction duct 53 as illustrated in FIG. 9A. The bottom end of the suction duct 53 as illustrated in FIG. 9A is attached and fixed to the suction-pad supporting member 54. A pair of suction pads 52 and suction ducts 53 are arranged in the Y-direction.

The carriage 50 according to the present embodiment is provided with a posture changing unit used to change the posture of one of the multiple medicine packages 2 picked up from one of the multiple cartridges 10 to a substantially vertical posture. Typically, the posture changing unit in the carriage 50 includes, for example, a suction-pad supporting member 54 coupled to a suction device base 57 through a rotation axis 55, a guide unit 59 formed with a guide groove **59*a* having a specific shape, a guide axis 56 that is consistently fitted into the guide groove 59***a* of the guide unit 59 to guide the suction-pad supporting member 54, and a suction pad lifting and lowering unit.

The suction-pad supporting member 54 is coupled to the suction device base 57 through the rotation axis 55. The suction-pad supporting member 54 may be may rotatably or pivotably be arranged around the rotation axis 55 fixed to the suction-pad supporting member 54 within a range of a predetermined angle. Alternatively, the suction-pad supporting member 54 may be may rotatably or pivotably be arranged around the rotation axis 55 fixed to the suction device base 57. In other words, in FIG. 9A and FIG. 9B, the distance between the center of the rotation axis 55 and the center of a guide rod 58 in the X-direction is kept constant at all times when the suction device base 57 moves along the guide rod 58 in the up and down directions parallel to the Z-direction. The guide rod 58 will be described later in detail.

The suction pad lifting and lowering unit includes a pair of guide rods 58 that are arranged separately in the Y-direction and guides the suction device base 57 in the Z-direction, an endless belt 62 looped around a driving pulley 60 and a driven pulley 61, and a drive motor 63 coupled to a driving pulley 60 through a driving power conveyor such a gear or a belt. The drive motor 63 according to the present embodiment serves as a driver circuit or a driving source of the suction pad lifting and lowering unit.

The suction device base 57 according to the present embodiment is coupled and fixed to the endless belt 62 at a belt grip 62*a* fixed to the right end of the suction device base 57. The pair of guide rods 58 are arranged at two different positions in the Y-direction, and extend in the Z-direction. The bottom ends of those guide rods 58 are fixed to the base frame 50*b* of the picking-up frame 50*a* provided for the carriage 50.

A pair of guiding holes 57*a* into which the pair of guide rods 58 are inserted are formed around a right end of the suction device base 57. The pulley axis of each one of the driving pulley 60 and the driven pulley 61 is rotatably supported by an immovable member on the picking-up frame 50*a*. The drive motor 63 is fixed to an immovable member provided for the picking-up frame 50*a* of the carriage 50.

When the suction device base 57 is lifted or lowered by the operation of the drive motor 63, the suction device base 57 is moved along the pair of guide rods 58 in the Z-direction. Accordingly, the posture of the suction device base 57 on the XY plane can be kept constant in a substantially horizontal state. The suction unit lifting and lowering unit is not limited to the above-described up-and-down reciprocating mechanism driven by a belt. Alternatively, for example, the suction unit lifting and lowering unit may have a reciprocating linear motion mechanism using a rack and pinion.

A pair of guide units 59 are arranged on both sides of the suction device 51 in the Y-direction with the suction-pad supporting member 54 interposed therebetween, and the bottom ends of the pair of guide units 59 are fixed to the base frame 50*b*. The guide axis 56 is arranged so as to protrude from both ends of the suction-pad supporting member 54 in the Y-direction, and is consistently fitted into the guide groove 59*a* of the guide unit 59 to guide the suction-pad supporting member 54. As illustrated in FIG. 9A, the guide axis 56 is provided below the rotation axis 55 of the suction-pad supporting member 54 in the Z-direction with a certain distance from the rotation axis 55.

When the suction device base 57 is moved in the Z-direction by the operation of the drive motor 63, the guide axis 56 of the suction-pad supporting member 54 is moved in the Z-direction parallel to the guide groove 59*a* having a specific shape while maintaining the posture of the suction device base 57 on the XY plane constant in a substantially horizontal state. Due to such a configuration, the posture of the suction pad 52 can be rotated by approximately 90 degrees. In FIG. 9A, the suction device 51 that is rotated by approximately 90 degrees is indicated by thick broken lines. In the present embodiment, the expression "substantially horizontal state" indicates that the posture of a particular element is within a specific range of tolerance for angle with respect to the horizontal in addition to a state in which the position of a particular element is horizontal.

The guide groove 59*a* having a specific shape includes the first guide groove portion that extends in the Z-direction with relatively great length so as to hold the posture of the pair of suction pads 52 upward as indicated by solid lines in FIG. 9A through the suction-pad supporting member 54 in a substantially horizontal state as guided by the guide axis 56, and the second guide groove portion that gently draw an obtuse and shallow arc to the right side as it goes downward to rotate the posture of the suction-pad supporting member 54 and the pair of suction pads 52 by approximately 90 degrees. The first guide groove portion and the second guide groove portion communicate with each other and are coupled to each other.

As illustrated in FIG. 9A and FIG. 9B, the carriage 50 according to the present embodiment is provided with an upper QR code reader 66 that serves as a medication-related information reader or a medication-related information reader unit 65 that reads the medication-related information 6*c* of the QR code (registered trademark) displayed on, for example, the medicine package 2 stored in one of the multiple cartridges 10, as illustrated in, for example, FIG. 5A and FIG. 5B. The upper QR code reader 66 according to the present embodiment has an upper reader unit 66*a* that reads the medication-related information 6*c* at an upper portion thereof, and also serves as a medication-related information reader unit 65 as will be described later in detail with reference to FIG. 15 and FIG. 16. The upper QR code reader 66 is attached to a side of the carriage 50.

The upper QR code reader 66 according to the present embodiment is also used to read the QR code (registered trademark) that indicates the medication-related information 6*c* displayed on the label 7 with QR code (see FIG. 6A and FIG. 6B) pasted to the left support portion 13 of the pack pickup slot 17 in one of the multiple cartridges 10. Cases are described below in which the QR code (registered trademark) that indicates the medication-related information 6*c* is read by the upper reader unit 66*a* of the upper QR code reader 66 immediately before the medicine package 2 is picked up from one of the multiple cartridges 10 by the carriage 50.

As illustrated in FIG. 9A and FIG. 9B, the carriage 50 according to the present embodiment is provided with the medication-related information reader unit 65 or the lower QR code reader 67 that serves as a medication-related information reader and reads the QR code (registered trademark) of the label 7 with QR code that is pasted onto the subdivision box 34 described as above with reference to FIG. 4A and FIG. 4B to indicate the medication-related information 6*c*. The lower QR code reader 67 according to the present embodiment has the lower reader unit 67*a*, which also serves as the medication-related information reader unit 65, at a lower position, and is attached to a side of the carriage 50 below the upper QR code reader 66. Cases are described in which the QR code (registered trademark) on the subdivision box 34 that indicates the medication-related information 6c is read by the lower reader unit 67a of the QR code reader 67 immediately before one of the multiple medicine packages 2 picked up from one of the multiple cartridges 10 is dispensed to one of the multiple subdivision boxes 34 of the medicine dispensing tray 30.

The operation of the carriage 50 will be described below in detail with reference to FIG. 10 to FIG. 12C.

Figure 10:
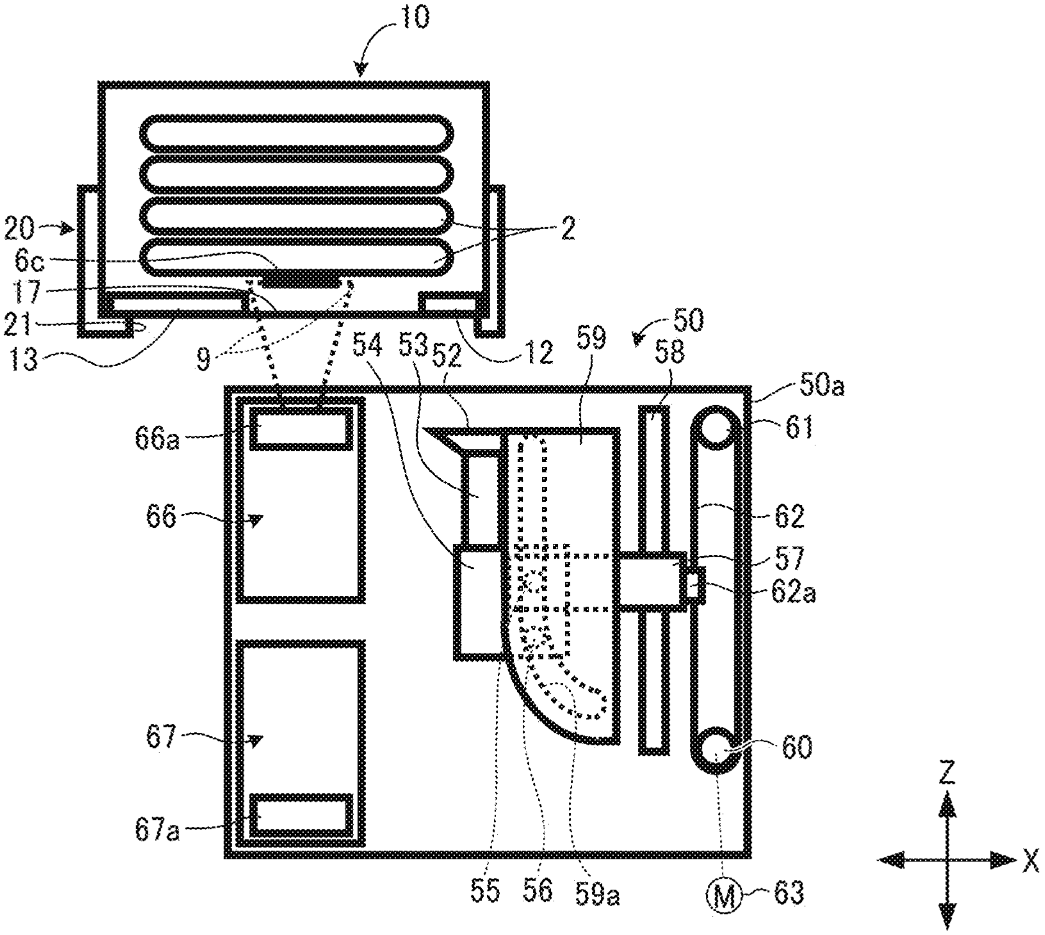
FIG. 10 is a front view of a carriage and illustrates the progression of the operation of the carriage, according to an embodiment of the present disclosure.

FIG. 10 is a front view of the carriage 50 and illustrates the progression of the operation of the carriage, according to the present embodiment.

FIG. 11A to FIG. 11F are front views of the carriage 50 and illustrates the progression of the operation of the carriage subsequent to the operation illustrated in FIG. 10, according to the present embodiment.

Figure 11C:
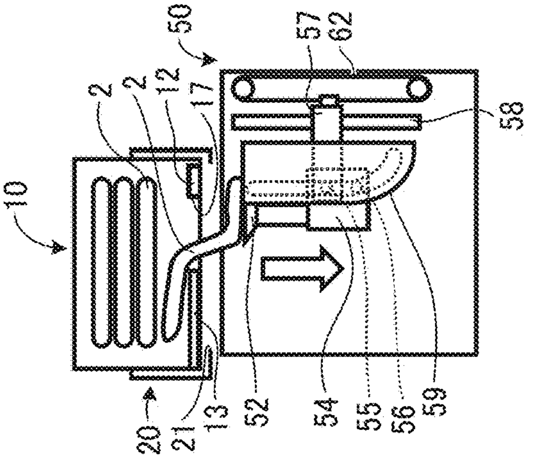
FIG. 11A to FIG. 11F are front views of a carriage and illustrates the progression of the operation of the carriage subsequent to the operation illustrated in FIG. 10, according to an embodiment of the present disclosure.
Figure 11B:
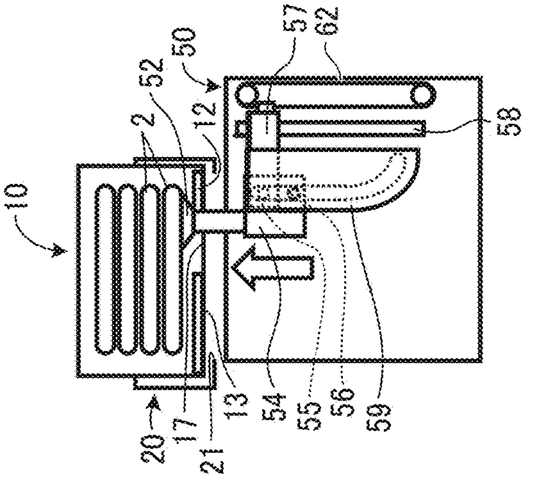
Figure 11A:
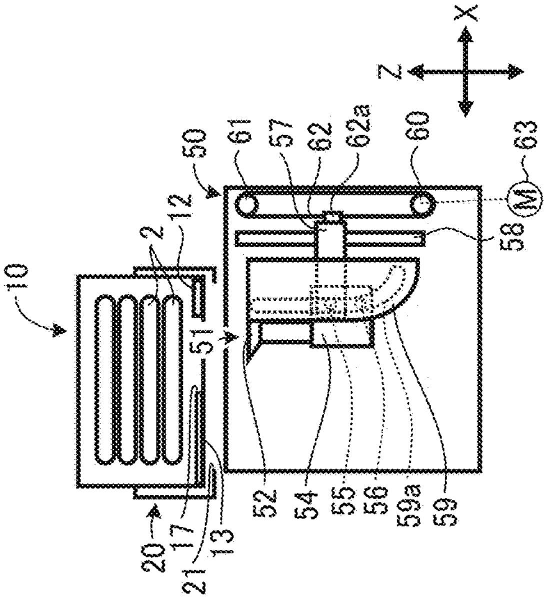
Figure 11D:
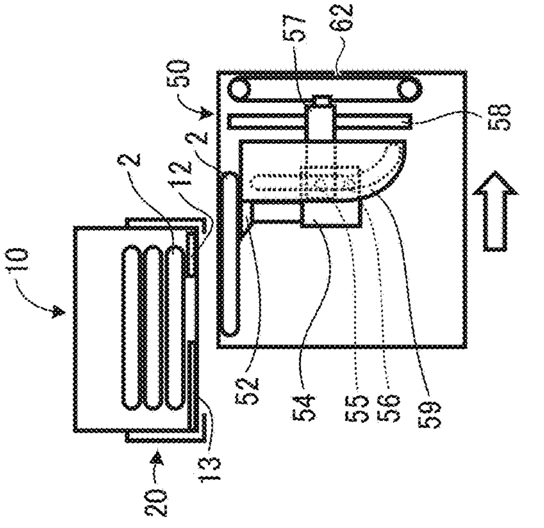
Figure 11E:
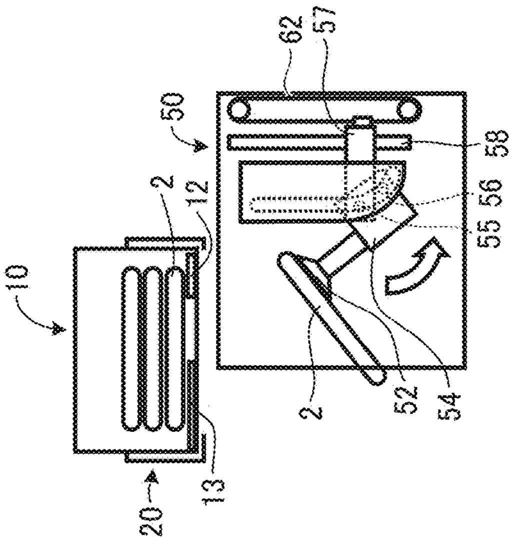
Figure 11F:
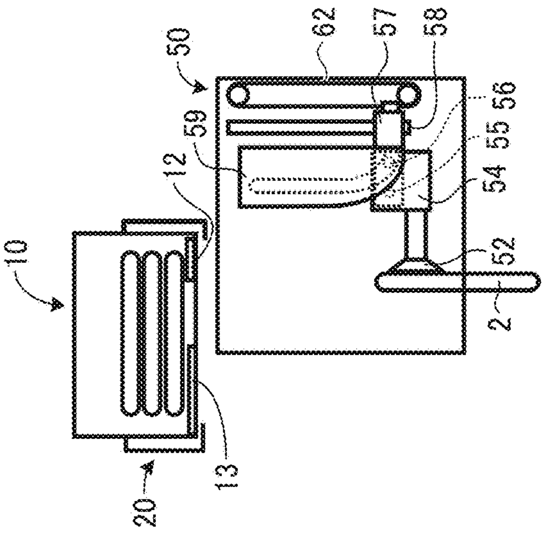
Figure 12C:
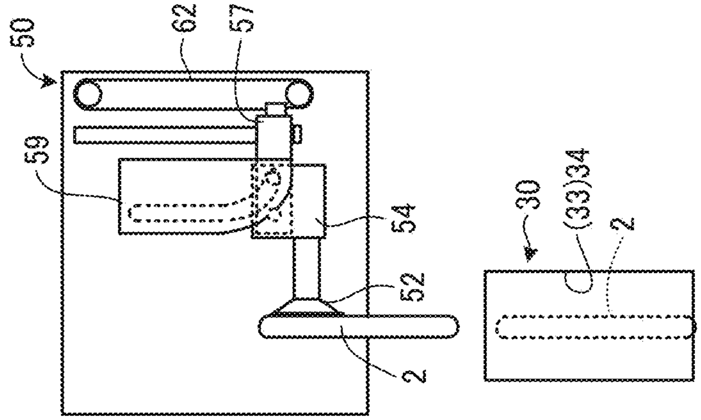
FIG. 12A, FIG. 12B, and FIG. 12C are front views of a carriage and illustrates the progression of the operation of the carriage subsequent to the operations illustrated in FIG. 11A to FIG. 11F, according to an embodiment of the present disclosure.
Figure 12B:
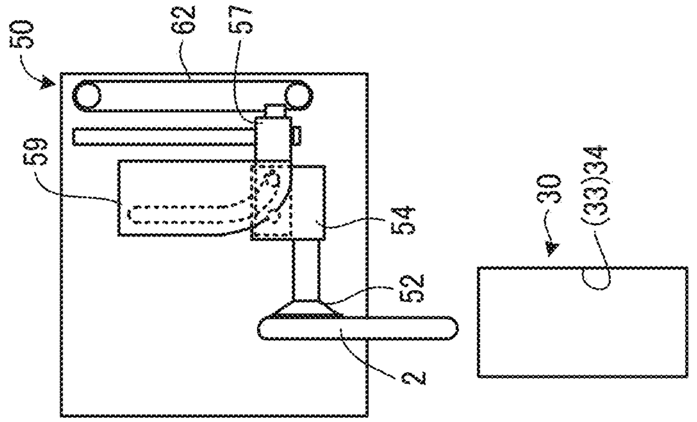
Figure 12A:
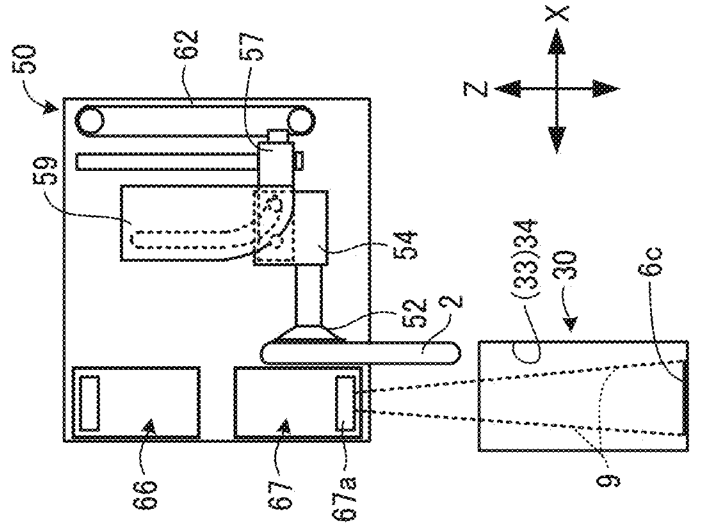

FIG. 12A, FIG. 12B, and FIG. 12C are front views of the carriage 50 and illustrates the progression of the operation of the carriage subsequent to the operations illustrated in FIG. 11A to FIG. 11F, according to the present embodiment.

For the sake of explanatory convenience, it is assumed in the present embodiment that by the operation of the conveyance unit 90 illustrated in FIG. 1A and FIG. 1B, the carriage 50 is arranged below the cartridge tray 20 held by the upper one of the pair of drawers 80 arranged at an uppermost portion and a lower portion of the housing 199 illustrated in FIG. 1A and FIG. 1B. In the present embodiment, it is assumed that the cartridges illustrated in FIG. 5A and FIG. 5B and the multiple cartridge trays illustrated in, for example, FIG. 1A and FIG. 1B are used as the multiple cartridges 10 and the multiple cartridge trays 20, respectively.

In FIG. 10, the carriage 50 can be moved by the conveyance unit 90 according to the present embodiment as illustrated in FIG. 1A and FIG. 1B in the X-axis direction and the Y-axis direction in the lower region of one of the multiple cartridges 10 and the cartridge tray 20. Firstly, as illustrated in FIG. 3, the carriage 50 according to the present embodiment moves below the cartridge tray 20 that holds one of the multiple cartridges 10 containing the multiple medicine packages 2 to be picked up. In other words, the upper reader unit 66a of the upper QR code reader 66 in the carriage 50 is approximately directly below the cartridge tray 20 and one of the multiple cartridges 10, and the QR code (registered trademark) that indicates the medication-related information 6c on the medicine package 2 stored at the bottom of one of the multiple cartridges 10 can be scanned and read by the upper reader unit 66a of the upper QR code reader 66 through a scanning range 9 within the rectangular through opening 21 of the cartridge tray 20. The carriage 50 according to the present embodiment reads the QR code (registered trademark) that indicates the medication-related information 6c displayed on the medicine package 2, through the scanning range 9, using the upper reader unit 66a of the upper QR code reader 66.

Subsequently, the carriage 50 according to the present embodiment is slightly moved by the conveyance unit 90 as illustrated in FIG. 1A and FIG. 1B from the position as illustrated in FIG. 10 to the right in the X-axis direction as illustrated in the 11A. As a result, the carriage 50 moves to a position where one of the multiple medicine packages 2 at the bottom can be picked up from the same cartridge 10. Then, the carriage 50 stops moving. Under such conditions, the drive motor 63 of the suction unit lifting and lowering unit is stopped, and the pair of suction pads 52 are positioned under the position of the top face of the pickup unit, which indicates the position of the top face of the picking-up frame 50a of the carriage 50. Subsequently, as illustrated in FIG. 11B, the pair of suction pads 52 are moved upward by the operation of the drive motor 63, and enters from the pack pickup slot 17 between the right support portion 12 and the left support portion 13. Then, as soon as the pair of suction pads 52 contact one of the multiple medicine packages 2 at the bottom of one of the multiple cartridges 10, and the pair of suction pads 52 suck that medicine package 2. At that time, the negative-pressure generator 45 has been driven in advance so as to generate a negative pressure, and can suck up the medicine package 2.

Subsequently, as illustrated in FIG. 11C, as the drive motor 63 is reversely operated, the pair of suction pads 52 move downward while sucking one of the multiple medicine packages 2 by the pair of suction pads 52, and the front end of one of the multiple medicine packages 2 is pulled out from one of the multiple cartridges 10. The front end of the medicine package indicates a side of the medicine package to be absorbed or sucked up by the pair of suction pads 52, and the same applies in the following description.

Subsequently, as illustrated in FIG. 11D, by the operation of the conveyance unit 90, the carriage 50 is moved in the X-direction, which is the lateral direction, and the rear end of one of the multiple medicine packages 2 is drawn out or picked up from one of the multiple cartridges 10. Immediately after that, as illustrated in FIG. 11E and FIG. 11F, by the operation of the drive motor 63, one of the multiple medicine packages 2, which is approximately in a horizontal state and is sucked and held by the pair of suction pads 52, is rotated by substantially 90 degrees to change the posture to an approximately vertical or upright posture. In such rotational operation, the guide axis 56 that is arranged on the suction-pad supporting member 54 moves along the guide groove 59a of the guide unit 59. Accordingly, the posture of one of the multiple medicine packages 2 can be changed from an approximately horizontal posture to an approximately vertical posture. The above series of operation in the above configuration may be achieved by a series of operation performed by a single drive motor 63.

Then, as illustrated in FIG. 12A, the carriage 50 that includes the pair of suction pads 52 and holds one of the multiple medicine packages 2 in a substantially vertical posture is carried by the conveyance unit 90 to a predetermined position. When the lower reader unit 67a of the lower QR code reader 67 in the carriage 50 comes to the predetermined position at which the QR code (registered trademark) that indicates the medication-related information 6c and is displayed at the bottom of a predetermined one of the multiple subdivision boxes 34 or partitions 33 of one of the multiple medicine dispensing trays 30 moves to the scanning range 9, the lower reader unit 67a reads the QR code (registered trademark) that indicates the medication-related information 6c.

Subsequently, the carriage 50 according to the present embodiment is slightly moved by the conveyance unit 90 as illustrated in FIG. 1A and FIG. 1B from the position as illustrated in FIG. 12A to the right in the X-axis direction as illustrated in the 12B. As a result, the carriage 50 moves to a position where the picked-up medicine package 2 can be insertable into to a predetermined one of the multiple subdivision boxes 34 or partitions 33 of the same medicine dispensing tray 30. Then, the carriage 50 stops moving. Once the carriage 50 according to the present embodiment is carried to a position substantially directly above a predetermined one of the multiple subdivision boxes 34 or partitions 33 of one of the multiple medicine dispensing trays into which the picked-up medicine package 2 is insertable, the negative-pressure generator 45 according to the present embodiment is driven only for a short time in order to generate a positive pressure from the negative pressure. As a result, the suction holding of one of the multiple medicine packages 2 by the pair of suction pads 52 is released, and one of the multiple medicine packages 2 is inserted into a desired one of the multiple subdivision boxes 34 or a desired one of the multiple partitions 33 of the multiple medicine dispensing trays 30 (see, for example, FIG. 12C).

After the above-described operation is performed a plurality of times and a desired one of the multiple medicine packages 2 is inserted into one of the multiple partitions 33 that is at a predetermined position of one of the multiple medicine dispensing trays 30, one of the multiple medicine dispensing trays 30 is ejected to the outside of the medication support device 300 through the third gate 43 (see FIG. 1A and FIG. 1B), and is received by a staff or the like in a day-care center or nursing home or a medication assistant.

Some operations to be performed when the QR code (registered trademark) that is displayed on one of the multiple cartridges 10 and indicates the medication-related information 6*c*, as illustrated in FIG. 6A and FIG. 6B, is read by the upper reader unit 66*a* of the upper QR code reader 66, as illustrated in FIG. 9A and FIG. 9B, are described with reference to FIG. 13.

Figure 13:
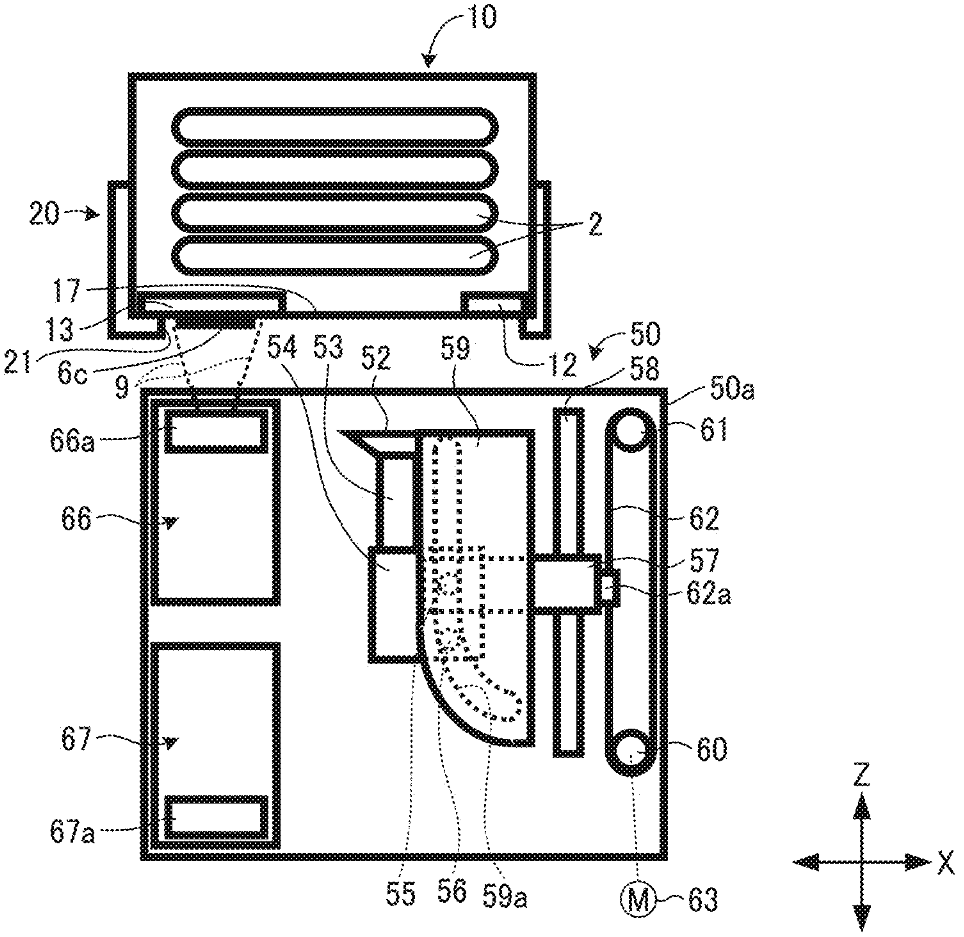
FIG. 13 is a front view of a cartridge and illustrates the operating of scanning the medication-related information displayed on the cartridge, according to an embodiment of the present disclosure.

FIG. 13 is a front view of one of the multiple cartridge 10 and illustrates the operating of scanning the medication-related information 6*c* displayed on the cartridge 10, according to the present embodiment.

One of the multiple cartridges 10 as illustrated in FIG. 6A and FIG. 6B is different from one of the multiple cartridges 10 as illustrated in FIG. 5A and FIG. 5B in respect that the position at which the QR code (registered trademark) that indicates the medication-related information 6*c* is displayed is changed from the bag 2*a* of the medicine package 2 to the bottom wall of the left support portion 13 of one of the multiple cartridges 10.

In order to read the QR code (registered trademark) displayed on the bottom wall of the left support portion 13 of one of the multiple cartridges 10 to indicate the medication-related information 6*c*, as illustrated in FIG. 13, the carriage 50 is moved to the left in the X-axis direction. More specifically, the carriage 50 is moved to a position within the scanning range 9 in which the QR code (registered trademark) displayed on the bottom wall of the left support portion 13 of one of the multiple cartridges 10 to indicate the medication-related information 6*c* can be scanned and read by the upper reader unit 66*a* of the upper QR code reader 66 in the carriage 50. The carriage 50 according to the present embodiment reads the QR code (registered trademark) displayed bottom wall of the left support portion 13 in one of the multiple cartridges 10 to indicate the medication-related information 6*c*, through the scanning range 9, using the upper reader unit 66*a* of the upper QR code reader 66. The operation of the carriage 50 according to the present embodiment is equivalent to the operation described above with reference to FIG. 11A to FIG. 12B, just except the operation described above with reference to FIG. 13.

In the above embodiments of the present disclosure, when desired one of the multiple medicine packages 2 is picked up from one of the multiple cartridges 10, the carriage 50 is positioned under one of the multiple cartridges 10 and one of the multiple cartridge trays 20, and such desired one of the multiple medicine packages 2 is taken out in the downward direction of one of the multiple cartridges 10. When one of the multiple medicine packages 2 is taken out from the lower side of one of the multiple cartridges 10 as described above, the next one of the multiple medicine packages 2 automatically moves downward or toward the pack pickup slot 17 due to the self weight of the movable board 16 and the multiple medicine packages 2 left in one of the multiple cartridges 10. Due to such a configuration, the carriage 50 can perform the same operation with a relatively simple configuration regardless of the number of the multiple medicine packages 2 left in one of the multiple cartridges 10.

The configuration and operation of the conveyance unit 90 will be described with reference to FIG. 14A and FIG. 14B.

Figure 14B:
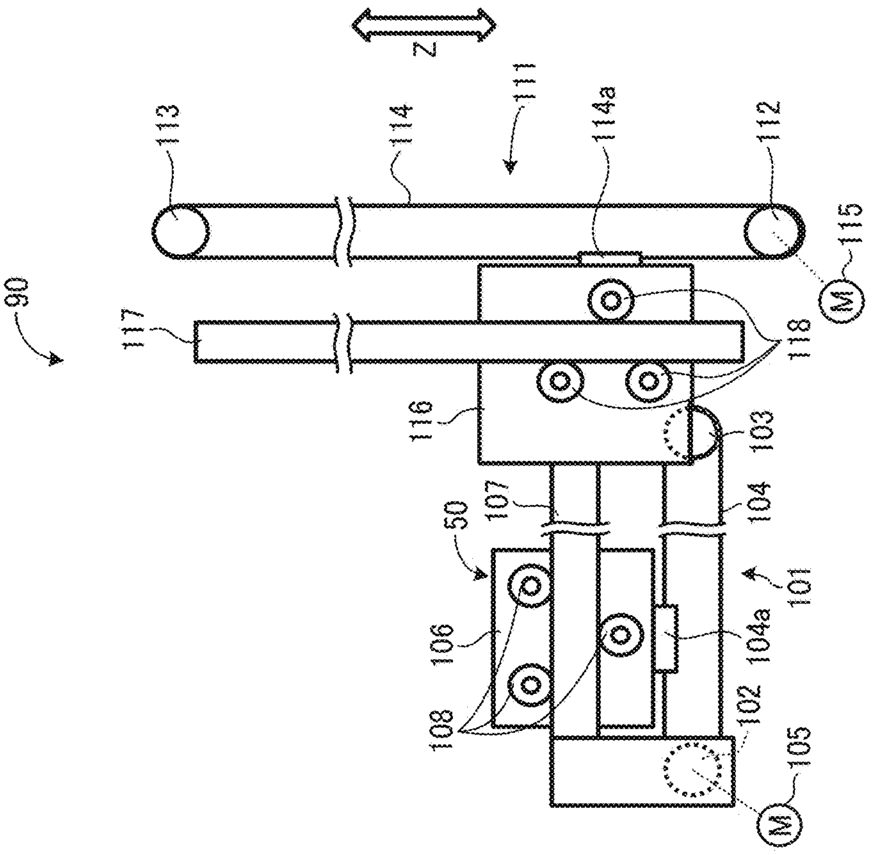
FIG. 14B is a side view of the conveyance unit illustrated in FIG. 14A, according to an embodiment of the present disclosure.
Figure 14A:
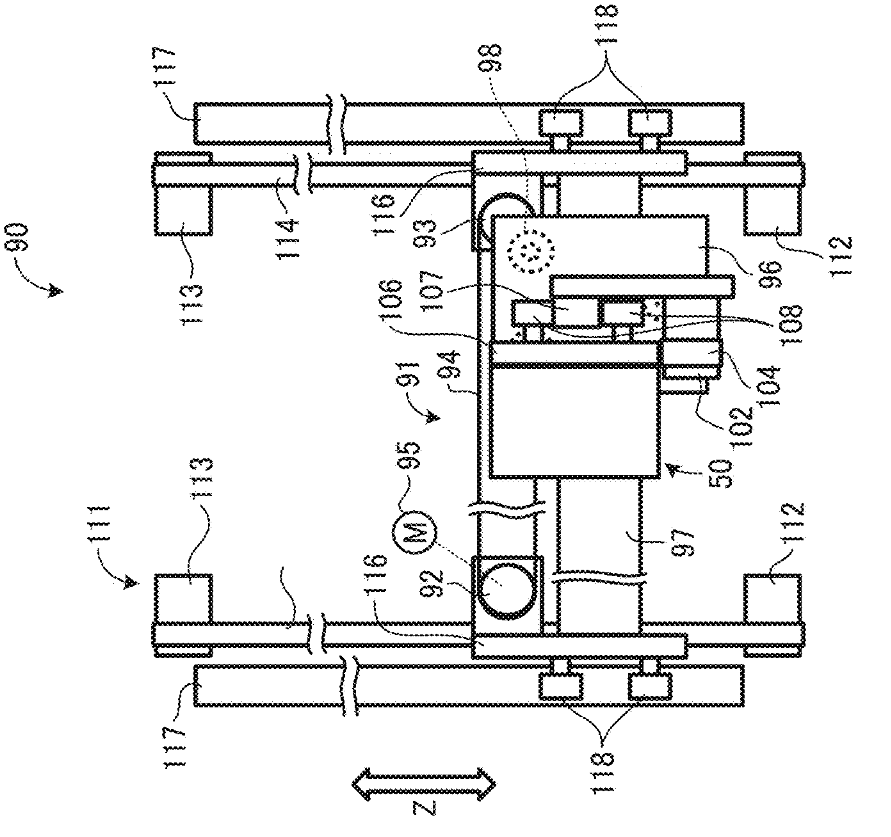
FIG. 14A is a front view of a conveyance unit illustrating a schematic configuration of the conveyance unit, according to an embodiment of the present disclosure.

FIG. 14A is a front view of the conveyance unit 90 illustrating a schematic configuration of the conveyance unit 90, according to the present embodiment.

FIG. 14B is a side view of the conveyance unit 90 illustrated in FIG. 14A, according to the present embodiment.

As in the configuration or structure of the medicine dispensing apparatus 200 illustrated in FIG. 1A and FIG. 1B, the multiple cartridges 10 are aligned in a row on a plane under the medicine dispensing tray 30 in the Z-direction, and the medicine dispensing tray 30 is arranged at an uppermost portion of the housing 199 and further above the upper portions of the multiple cartridges 10. In view of these circumstances, the carriage 50 is configured to move in three directions of the X-direction, the Y-direction, and the Z-direction. As described above, the conveyance unit 90 moves the carriage 50 in the X-direction, in the Y-direction, and in the Z-direction in order to convey one of the multiple medicine packages 2 picked up from one of the multiple cartridges 10 by the carriage 50 and pass it to one of the multiple medicine dispensing trays 30.

The carriage 50 is moved in the X-direction by an X-direction conveyance unit 91, and the carriage 50 is moved in the Y-direction by a Y-direction conveyance unit 101. The carriage 50 is moved in the Z-direction by a Z-direction conveyance unit 111. These three conveyance units have a similar configuration or structure.

The X-direction conveyance unit 91 according to the present embodiment includes an X-adaptor 96 attached to the carriage 50, an X-guide unit 97 that guides the carriage 50 in the X-direction through the X-adaptor 96, an endless belt 94 looped around a driving pulley 92 and a driven pulley 93, and a drive motor 95 coupled to the driving pulley 92 through a driving force conveyor such as a gear or a belt for the conveyance in the X-direction. As illustrated in FIG. 14B, three rollers 98 are attached to the X-adaptor 96 so as to clamp the X-guide unit 97. Due to such a configuration, the X-adaptor 96 can roll over the X-guide unit 97. Note that, in FIG. 14B, two of the three rollers 98 are hidden by the carriage 50. The X-adaptor 96 is fixedly coupled to the endless belt 94 through a belt grip.

With the above-described configuration of the X-direction conveyance unit 91, as the drive motor 95 is driven, the driving force is conveyed to the endless belt 94 through the driving force conveyor and the driving pulley 92. Accordingly, the endless belt 94 rotates, and the carriage 50 moves in the X-direction parallel to the X-guide unit 97 together with the X-adaptor 96.

The Y-direction conveyance unit 101 according to the present embodiment includes a Y-adaptor 106 attached to the carriage 50, a Y-guide unit 107 that guides the carriage 50 in the Y-direction through the Y-adaptor 106, an endless belt 104 looped around a driving pulley 102 and a driven pulley 103, and a drive motor 105 coupled to the driving pulley 102 through a driving force conveyor such as a gear or a belt for the conveyance in the Y-axis direction. Three rollers 108 are attached to the Y-adaptor 106 so as to clamp the Y-guide unit 107. Due to such a configuration, the Y-adaptor 106 can roll over the Y-guide unit 107. The Y-adaptor 106 is coupled and fixed to the endless belt 104 through the belt grip 104*a*.

With the above-described configuration of the Y-direction conveyance unit 101, as the drive motor 105 is driven, the driving force is conveyed to the endless belt 104 through the driving force conveyor and the driving pulley 102. Accordingly, the endless belt 104 rotates, and the carriage 50 moves in the Y-direction parallel to the Y-guide unit 107 together with the Y-adaptor 106.

The Z-direction conveyance unit 111 according to the present embodiment includes a pair of Z-adaptors 116 attached to both ends of the X-guide unit 97 in the X-axis direction, a pair of Z-guide units 117 that guides the carriage 50 in the Z-axis direction through the X-guide unit 97 and the pair of Z-adaptors 116, an endless belt 114 looped around a driving pulley 112 and a driven pulley 113, and a drive motor 115 coupled to the driving pulley 112 through a driving force conveyor such as a gear or a belt for the conveyance in the Z-axis direction. In the Z-direction conveyance unit 111, the pair of driving pulleys 112, the pair of driven pulleys 113, and the pair of endless belts 114 are arranged on both sides in the X-direction, respectively. By contrast, the drive motor 115 is provided for only on one of the pair of driving pulleys 112. Three rollers 118 are attached to each one of the pair of Z-adaptors 116 so as to clamp corresponding one of the pair of Z-guide units 117. Due to such a configuration, the pair of Z-adaptors 116 can roll over the pair of Z-guide units 117, respectively. The pair of Z-adaptors 116 are coupled and fixed to the pair of endless belts 114 through a pair of belt grips 114*a*, respectively.

With the above-described configuration of the Z-direction conveyance unit 111, as the drive motor 115 is driven, the driving force is conveyed to the pair of endless belts 114 through the driving force conveyor and the driving pulley 112. Accordingly, the pair of endless belts 114 rotates, and the carriage 50 moves in the Z-direction parallel to the Z-guide unit 117 together with the X-guide unit 97 and the Z-adaptor 116.

In FIG. 14A and FIG. 14B, the carriage 50 is configured to move in the triaxial directions including the X-axis direction, the Y-axis direction, and the Z-axis direction. However, no limitation is indicated thereby. For example, when the multiple cartridges 10 are arranged above the carriage 50 and the multiple medicine dispensing trays 30 are arranged below the carriage 50, the carriage 50 only needs to move in the X-direction and the Y-direction. In such cases, the number of axes of motion can be reduced by one.

In the embodiments of the present disclosure as described above, the QR code reader that serves as a pack data reader is divided into two sections including the upper QR code reader 66 provided with the upper reader unit 66*a* and the lower QR code reader 67 provided with the lower reader unit 67*a*. However, no limitation is indicated thereby, and one integrated QR code reader may be used.

As will be described later, the reading operation of the QR code (registered trademark) is controlled to automatically start upon detecting the storing of one of or both one of the multiple cartridges 10 and one of the multiple medicine dispensing trays 30. The reading operation of the QR code may start immediately before one medicine pack is picked up from one of the multiple cartridges 10 or immediately before medicines are dispensed to one of the multiple medicine dispensing trays 30. The reading operation of the QR code may start at any time specified by an operation made by a user. No limitation is intended thereby in terms of a method for implementation.

In the present embodiment, the QR code (registered trademark) on the carriage 50 and the QR code (registered trademark) on each one of the multiple subdivision boxes 34 of the medicine dispensing tray 30 are read, and multiple items of information are stored. Then, such multiple items of information are used to make comparison when medicines are dispensed, as will be described later in detail with reference to FIG. 16.

Figure 15:
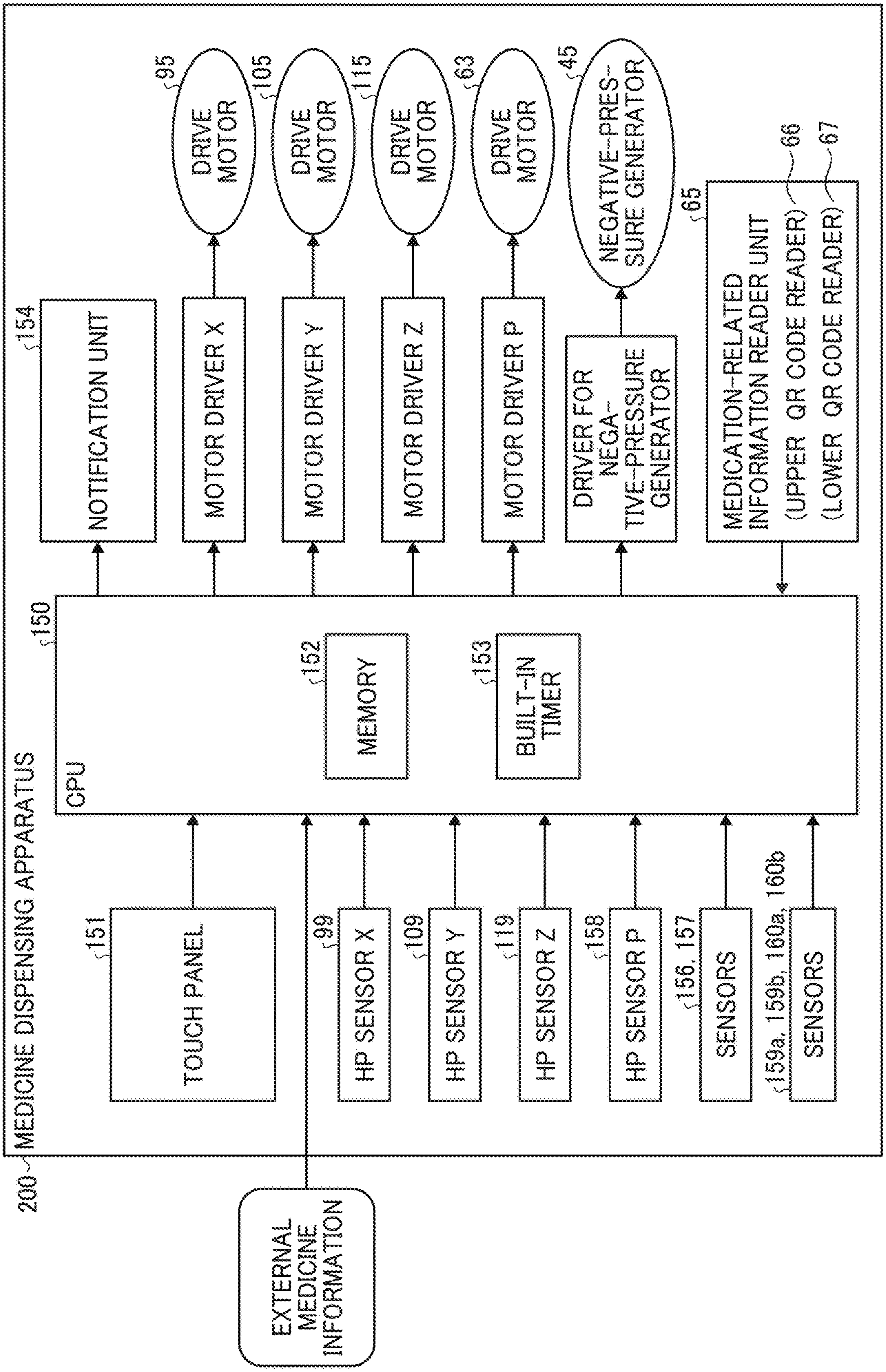
FIG. 15 is a control block diagram illustrating a schematic control structure for a medicine dispensing apparatus, according to an embodiment of the present disclosure.

FIG. 15 is a control block diagram illustrating a schematic control structure for the medicine dispensing apparatus 200, according to the present embodiment.

As illustrated in FIG. 15, the medicine dispensing apparatus 200 includes a central processing unit (CPU) that serves as a controller 150 that controls the operation of, for example, the components or elements of the medicine dispensing apparatus 200. For example, the CPU may be provided with a built-in memory 153 or a built-in timer. The CPU according to the present embodiment may provide notification to a staff or the like at a timing consistent with the program or may instruct the medication support device 300 to perform particular operation, based on various kinds of input such as the inputs from a sensor as will be described later in detail.

The CPU may have, for example, a computing or control function, and a timer or clocking function. The memory 152 of the controller 150 includes a random access memory (RAM) that is referred to as a main memory, and a read-only memory (ROM). The ROM according to the present embodiment stores, for example, a program readable by the above CPU and various kinds of data in advance. Such a program stored in the ROM may be a program used in the flowchart of the controlling processes as will be described later in detail. The above various kinds of data may be, for example, the data about the relation between the multiple medicine packages 2 and the multiple partitions 33 or the multiple subdivision boxes 34 of one of the multiple medicine dispensing trays 30 allocated to each of the patients who take medicines, the data about the relation between the multiple medicine packages 2 and the multiple partitions 33 or the multiple subdivision boxes 34 of one of the multiple medicine dispensing trays 30 assigned to each one of the times of medication, or the data about the relation between the multiple medicine packages 2 and the multiple partitions 33 or the multiple subdivision boxes 34 of one of the multiple medicine dispensing trays 30 sorted according to the order in which medicines are to be taken.

The CPU according to the present embodiment has an input and output (I/O) port, and a touch panel 151 that serves as a user interface (UI) is electrically connected to that input and output port of the CPU. However, no limitation is intended thereby, and the touch panel 151 may be, for example, a combination of an input device and a display interface such as a combination of a keyboard and a light-emitting diode (LED) display.

The CPU according to the present embodiment has an input port, and a medicine dispensing tray sensor 156 that detects the type of medicine dispensing tray 30 stored in the medication support device 300 or determines whether or not there is any medicine dispensing tray 30, and a cartridge sensor 157 that determines whether or not there is any one of the multiple cartridges 10 are electrically connected to the input port of the CPU. As various types of sensors, a pair of drawer gate opening and closing sensors 159*a* and 159*b* that detect the opening and closing of the first gate 41 and the second gate 42 and a pair of medicine dispensing tray gate opening and closing sensors 160*a* and 160*b* that detect the opening and closing of the third gate 43 and the fourth gate 44 are electrically connected to the input port of the CPU. The medicine dispensing tray sensor 156, the cartridge sensor 157, the pair of drawer gate opening and closing sensor 159*a* and 159*b*, and the pair of medicine dispensing tray gate opening and closing sensors 160*a* and 160*b* are illustrated only in FIG. 15.

Moreover, a HP sensor 99 for a HP sensor X, which detects the home position (HP) of the X-direction conveyance unit 91 in the carriage 50, a HP sensor 109 for a HP sensor Y, which detects the home position (HP) of the Y-direction conveyance unit 101 in the carriage 50, and a HP sensor 119 for a HP sensor Z, which detects the home position (HP) of the Z-direction conveyance unit 111 in the carriage 50 are electrically connected to the input port of the CPU. Note that such a home position (HP) of each conveyance unit may be abbreviated to HP in the following description. Further, to the input port of the CPU, a position (HP) sensor 158 for a HP sensor P, which detects the home position (HP) of the suction pad 52 of the suction device 51 in the carriage 50 is electrically connected.

The upper QR code reader 66 that serves as the medication-related information reader unit 65 or an upper reader unit 66*a* and the lower QR code reader 67 that serves as the medication-related information reader unit 65 or a lower reader unit 67*a*, each of which is arranged on the carriage 50, are electrically connected to the input port of the CPU.

Moreover, each one of the drive motor 95 for the X-direction conveyance unit 91, the drive motor 105 for the Y-direction conveyance unit 101, the drive motor 115 for the Z-direction conveyance unit 111, and the drive motor 63 used to change the posture of the suction pad 52 is electrically connected to the output port of the CPU through various types of motor drivers X, Y, Z, and P. Moreover, the negative-pressure generator 45 that serves as an ejector valve and an actuator for the negative pressure generator is electrically connected to the output port of the CPU through a driver for a negative-pressure generator. To the output port of the CPU, a notification unit may be electrically connected. Such a notification unit reports what sort of state or conditions the components or elements of the medication support device 300 are in by means of, for example, the light emitted from a light-emitting diode (LED) and the sound or vibration including voice. Moreover, such a notification unit may be provided with, for example, a loudspeaker or a light that indicates that the medicines are to be taken so that the staff or the like away from the medication support device 300 can be notified of such a time of medication.

The external medicine information is also input to the CPU through an input and output (I/O) interface, and is stored in the memory 152. For example, the external medicine information is used for the allocation of medicines to patients who take medicines. For example, the LEDs 25*a*1 to 25*d*5 of the drawer 80 may be electrically connected to each other.

Once the input data from the touch panel 151 and various kinds of signals from various types of sensors or the HP sensors 99, 109, 119, and 158 are input to the CPU, a command signal is newly output from the CPU. In other words, the CPU according to the present embodiment outputs a command signal used to control the audio device or the optical device of the display device of the touch panel 151 including the above notification unit, the LEDs 25*a*1 to 25*d*5, the negative-pressure generator 45, the drive motor 63, the drive motor 95, the drive motor 105, the drive motor 115, or the multiple drives that correspond to the multiple LEDs.

The HP sensor 158 for the HP sensor P and the drive motor 63 that outputs power through the motor driver P are used to control or drive the mechanism for moving the suction device to move upward and downward. The CPU according to the present embodiment has a function to execute various kinds of control operation as will be described later in detail in the following description or the flowchart of the controlling processes.

A control structure for the medication support device 300 according to the present embodiment is described below with reference to FIG. 16.

Figure 16:
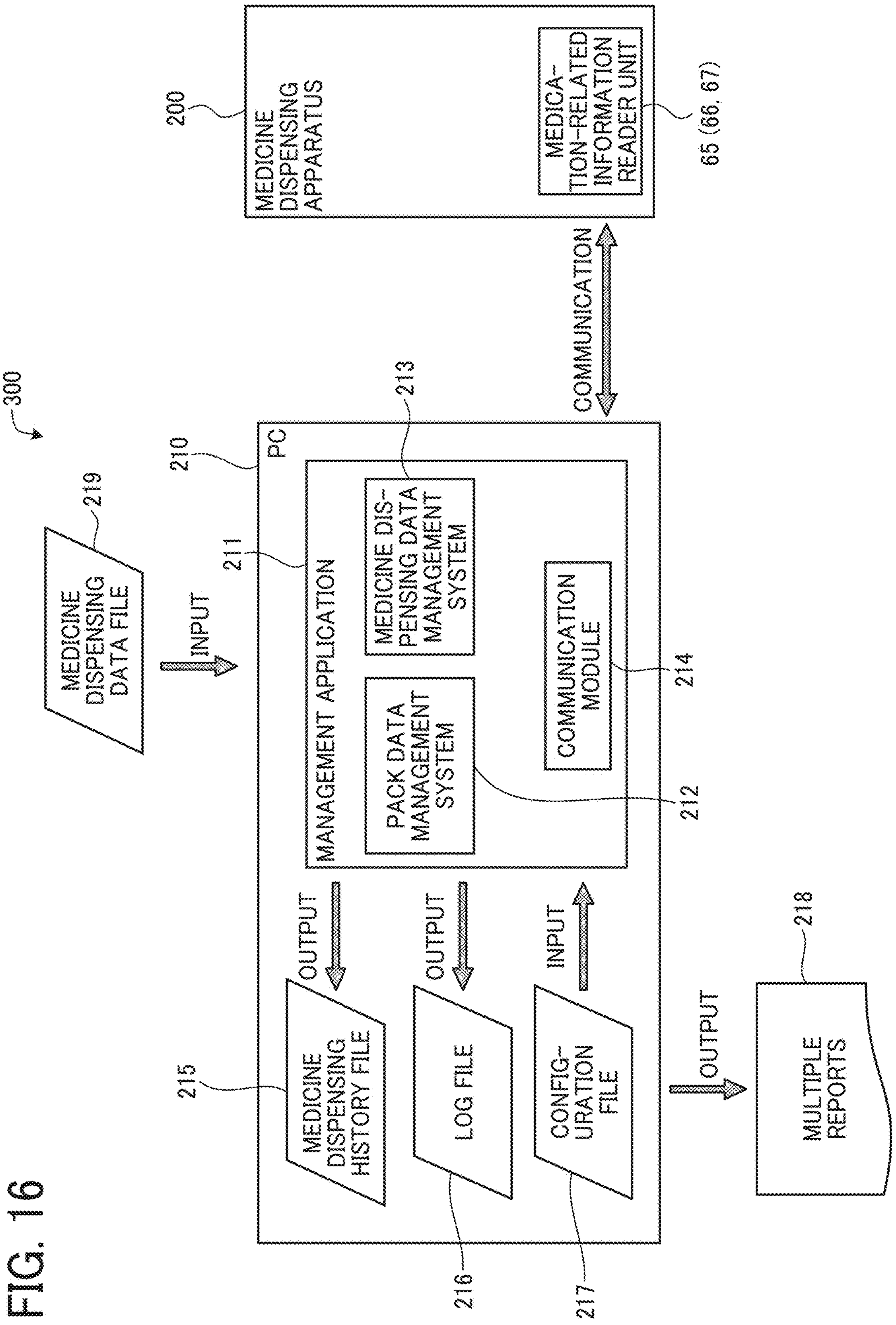
FIG. 16 is a control block diagram illustrating a medication support device according to an embodiment of the present disclosure.

FIG. 16 is a control block diagram illustrating the medication support device 300 according to the present embodiment.

As illustrated in FIG. 16, the medication support device 300 according to the present embodiment is provided with the above-described medicine dispensing apparatus 200 and a personal computer (PC) 210 coupled to the medicine dispensing apparatus 200. Such coupling enables communication such as data transmission and data reception. The PC 210 according to the present embodiment includes five elements known in the art. In other words, the PC 210 according to the present embodiment is provided with, for example, a controller, a processor, a memory, an input device, and an output device. The above controller of the PC 210 is provided with a central processing unit (CPU), and executes a program or gives instructions to other devices. The above processor of the PC 210 executes a program or performs computation. The above memory of the PC 210 is provided with, for example, a main memory and an auxiliary memory, and stores data such as programs or texts. The above input device of the PC 210 includes, for example, a mouse, a keyboard, a microphone, and sends data or instructions to the computer. The above output device of the PC 210 includes, for example, a display, a printer, a loudspeaker, and outputs the data output from the computer.

The PC 210 fulfills the function of the medicine dispensing apparatus 200, and serves as a sort of host computer that manages and supports the medicine dispensing apparatus 200 in order to handle the above technical problems and other various kinds of possible problems to be solved in the embodiments of the present disclosure. The PC 210 is connected to a terminal in a pharmacy or the like at which the medicine is supplied, through the network.

The pack data management system 212 provided for the management application 211 reads and manages the medication-related information of the medicine pack. The medicine dispensing data management system 213 provided for the management application 211 reads and manages the medicine dispensing data including at least the name of a patient who takes medicines and the times of medication.

For example, the pack data management system 212 and the medicine dispensing data management system 213 may be implemented as the management application 211 in the PC 210. Alternatively, as illustrated in FIG. 16, the pack data management system 212 and the medicine dispensing data management system 213 may be implemented by a system that includes the medicine dispensing apparatus 200 and the PC 210 and performs management by communicating with the medicine dispensing apparatus 200. The management application 211 according to the present embodiment reads the medicine dispensing data file 219 that is externally generated at, for example, a pharmacy at which medicines are supplied based on a prescription issued by a doctor and includes, for example, the times at which medicines are dispensed and the medicine information of each patient who takes medicines. The management application 211 according to the present embodiment reads the data output from the configuration file 217 in which, for example, the setting information set to the PC 210 on a temporary basis is recorded.

For example, a file to be output as log file 216 according to what has been changed or a medicine dispensing history file 215 in which medicine dispensing history is tracked is the data to be output from the management application 211 as necessary. Further, the multiple reports 218 are output as necessary from the PC 210 through the management application 211. The functions such as of the management application 211 of the PC 210 may be arranged in the medicine dispensing apparatus 200.

In the medicine dispensing data management system 213 according to the present embodiment, the results of medicine dispensing or the change history are stored as record. By so doing, the actual medicine dispensing results are stored as traceability information. Due to such a configuration, reviewing is possible when a problem occurs.

The pack data management system 212 according to the present embodiment performs management based on the medication-related information of the medicine pack including at least the name of a patient who takes medicines and the times of medication. However, no limitation is indicated thereby, and a supplementary explanation of the operation of, for example, the medicine dispensing apparatus 200 described as above is given below. As illustrated in FIG. 9A and FIG. 9B, the carriage 50 according to the present embodiment is provided with the upper QR code reader 66 and the lower QR code reader 67 in the medicine dispensing apparatus 200. The carriage 50 according to the present embodiment moves close to one of the multiple cartridges 10 that stores a medicine pack such as the medicine package 2 and the bound medicine package 2A, and the QR code (registered trademark) that indicates the medication-related information 6*c* can be read by the upper reader unit 66*a* of the upper QR code reader 66.

As illustrated in FIG. 5A and FIG. 5B, when the medication-related information 6*c* is displayed on the surface of the medicine pack, as illustrated in FIG. 10, the QR code (registered trademark) is visible through the pack pickup slot 17. As a result, the QR code is read by the upper reader unit 66*a* of the upper QR code reader 66. As illustrated in FIG. 13, even when the medication-related information 6*c* is displayed on the left support portion 13 on the bottom wall of one of the multiple cartridges 10, the QR code (registered trademark) that indicates the medication-related information 6*c* can be read by the upper reader unit 66*a* of the upper QR code reader 66 in a similar manner to the above because the position at which the medication-related information 6*c* is displayed is the pack pickup slot 17.

As illustrated in FIG. 12A, also when the carriage 50 according to the present embodiment moves to a position above desired one of the multiple subdivision boxes 34 of the medicine dispensing tray 30 while holding one of the multiple medicine packages 2 picked up from one of the multiple cartridges 10, the QR code (registered trademark) that indicates the medication-related information 6*c* can be read by the lower reader unit 67*a* of the lower QR code reader 67 in a similar manner to the above. Due to such a configuration, the data read by the upper QR code reader 66 or the lower QR code reader 67 is sent to the pack data management system 212 provided for the PC 210, through the communication module 214.

As the carriage 50 according to the present embodiment is provided with the upper QR code reader 66 and the lower QR code reader 67, the name of a patient who takes medicines and the current position of the cartridge 10 in which the medicine pack to be taken by the patient who takes medicines is stored can be detected by the movement of the carriage 50 in the medicine dispensing apparatus 200 (see, for example, FIG. 1A and FIG. 1B). In other words, when the QR code (registered trademark) on the cartridge 10 is read by the upper QR code reader 66 to obtain the position coordinates of the cartridge 10 in the medicine dispensing apparatus 200 corresponding to the current position of the cartridge 10, the position coordinates of the carriage 50 corresponding to the current position of the cartridge 10 can be linked to the QR code (registered trademark) that indicates the medication-related information 6*c*. In the position coordinates of the cartridge, for example, X, Y, and Z indicate the rows, columns, and stages, respectively.

What is displayed on the display screen 220 of the PC 210 as illustrated in FIG. 16 by the management application 211 is described with reference to FIG. 17.

Figure 17:
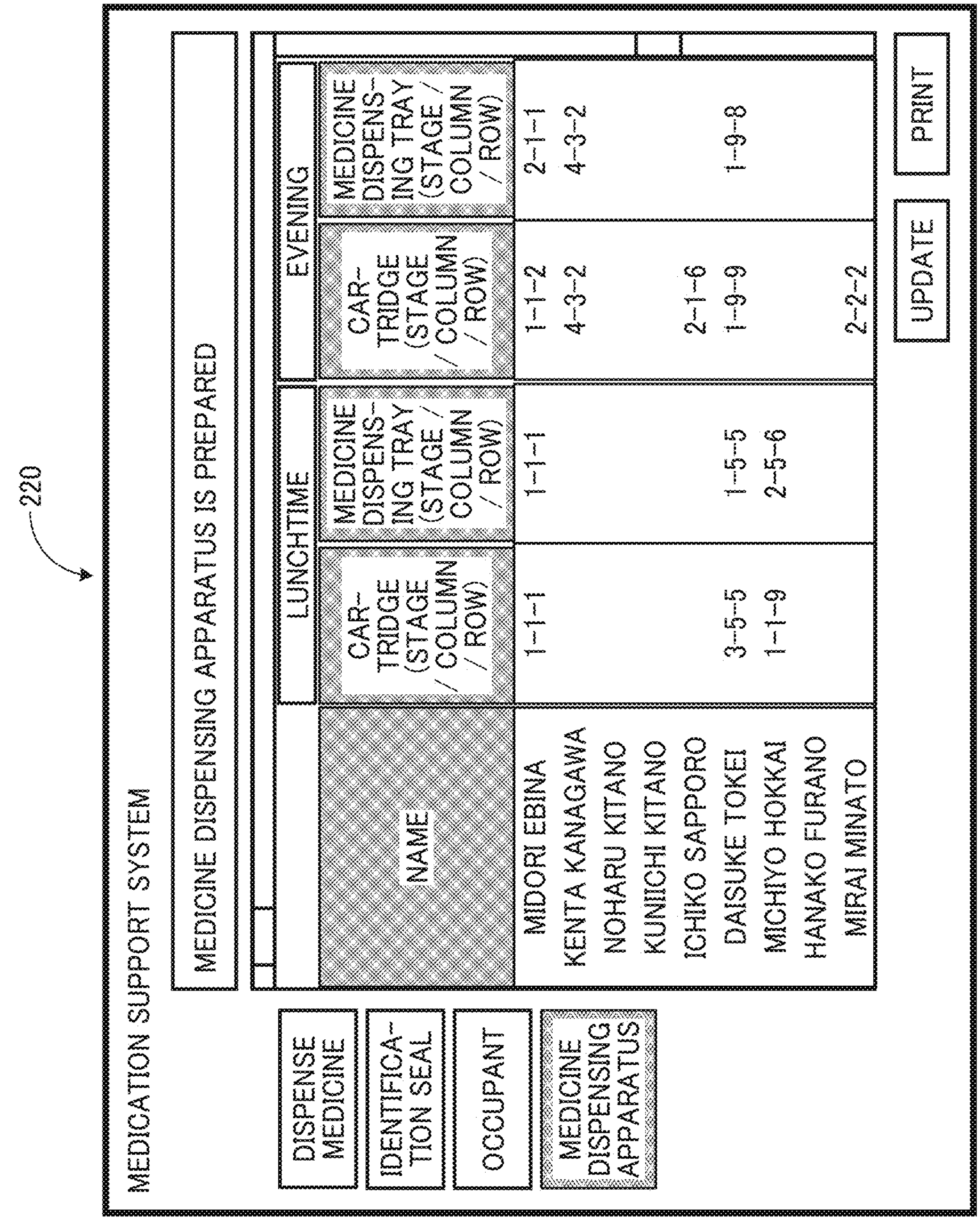
FIG. 17 is a diagram illustrating an on-screen display of a management application, according to an embodiment of the present disclosure.

FIG. 17 is a diagram illustrating an on-screen display of the management application 211 displayed on a monitor of a personal computer (PC), according to the present embodiment.

As illustrated in FIG. 17, the current position coordinates of the cartridge 10 in which the medicine pack to be taken by the patient is displayed in the table of matrixes in which the name of each occupant or patient who takes medicines and the times of medication of each patient who takes medicines are listed. Due to such a table of matrixes as above, the name of a patient who takes medicines, the times of medication of each patient who takes medicines, and the current position coordinates of the cartridge 10 in which the medicine pack to be taken by the patient can be managed.

More specifically, when the unique name of the occupant is "Midori Ebina" (titles of respect are omitted) and the time of medication is at lunchtime in FIG. 17, the carriage moves to a specific position and the medicines 3 of the medicine pack in one of the multiple cartridges 10 positioned at specific position coordinates [(1 (stage)−1 (column)−1 (row)] are supplied to and taken by the occupant. The same applies to into what partition or subdivision box 34 of the medicine dispensing tray 30 the specific medicine pack picked up from one of the multiple cartridges 10 positioned at specific position coordinates is to be inserted, and thus its description is omitted.

The medicine dispensing data management system 213 as illustrated in FIG. 16 is described below with reference to the table of medication administration as illustrated in FIG. 18.

FIG. 18 is a table of medication administration, which serves as the medicine dispensing data file 219, according to the present embodiment.

As illustrated in FIG. 18, a list is given such that who is to take medicines at what timing in the day-care center or nursing home is viewable.

As illustrated in the table of FIG. 18, the names of occupants are listed in multiple rows, and a tick is given if any medicine contained in a medicine pack and to be taken at times of medication on each date is present next to each name.

The medicine dispensing data file 219, as illustrated in the table of medication administration of FIG. 18, is read into the medicine dispensing data management system 213. By so doing, as will be described later in detail, the medicine dispensing data can be checked against the medication-related information.

A method of reading the medicine dispensing data file 219 into the medicine dispensing data management system 213 is described below with reference to FIG. 19.

Figure 19:
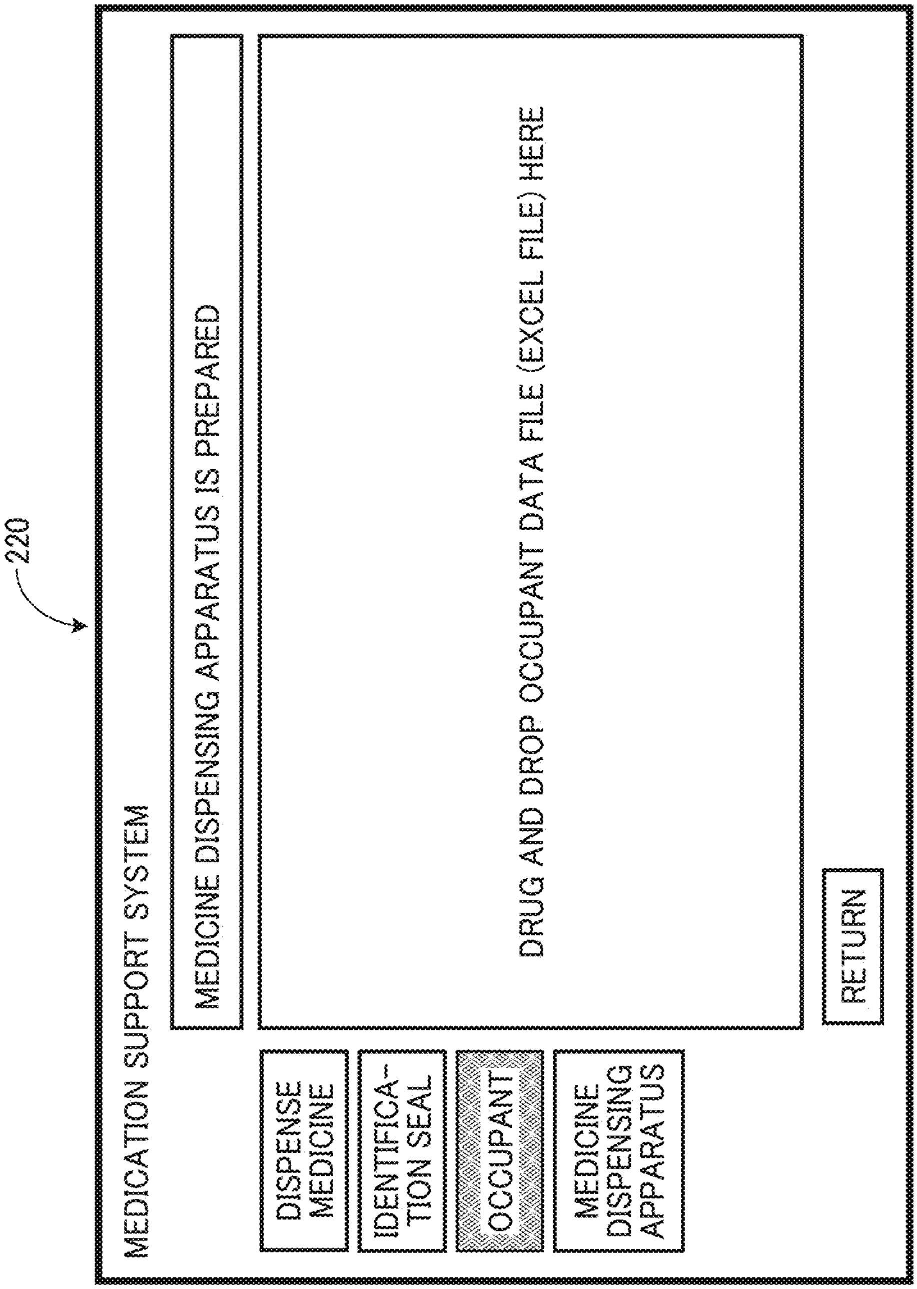
FIG. 19 is another diagram illustrating an on-screen display of a management application, according to an embodiment of the present disclosure.

FIG. 19 is a diagram illustrating an on-screen display of the management application 211 when the medicine dispensing data file 219 is read into the medicine dispensing data management system, according to the present embodiment.

As illustrated in FIG. 19, a page for reading the medicine dispensing data file 219 is prepared by the management application 211 on the display screen 220. On such an on-screen display, a file in which the medicine dispensing data is listed is dragged and dropped by manipulating a computer mouse. By so doing, the medicine dispensing data can be read into the medicine dispensing data management system 213. As this reading operation uses the format of the occupant data file, the numerical values at multiple matrix positions in the table are recognized on the application and stored.

FIG. 20A, FIG. 20B, FIG. 20C, and FIG. 20D are diagrams each illustrating what is displayed by the management application 211 when the read medicine dispensing data is extended for each period, according to the present embodiment.

Figure 20A:
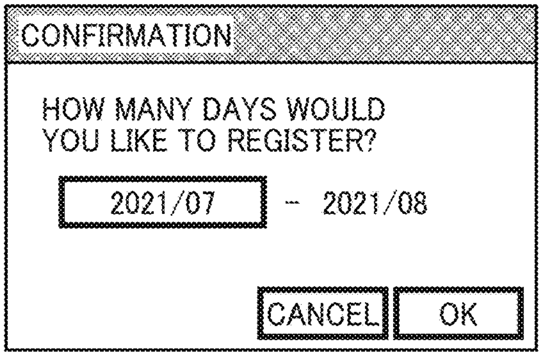
FIG. 20A, FIG. 20B, FIG. 20C, and FIG. 20D are diagrams each illustrating an on-screen display of a management application, according to an embodiment of the present disclosure.

FIG. 20A is a diagram illustrating a selecting operation to extend the read medicine dispensing data to the designated date, according to the present embodiment.

Registration is performed on a monthly basis to be managed. By so doing, medicine dispensing management data of that month can be generated.

Figure 20B:
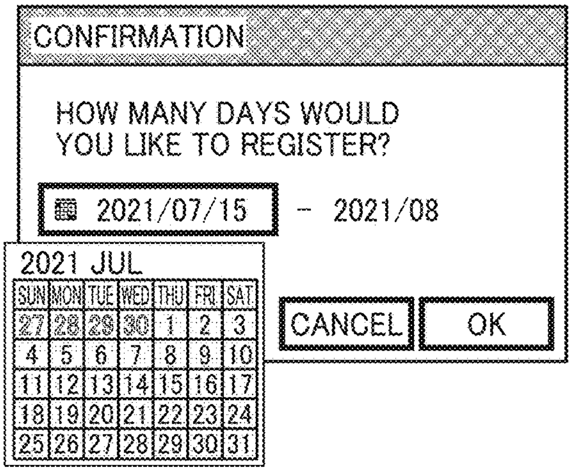
Figure 20C:
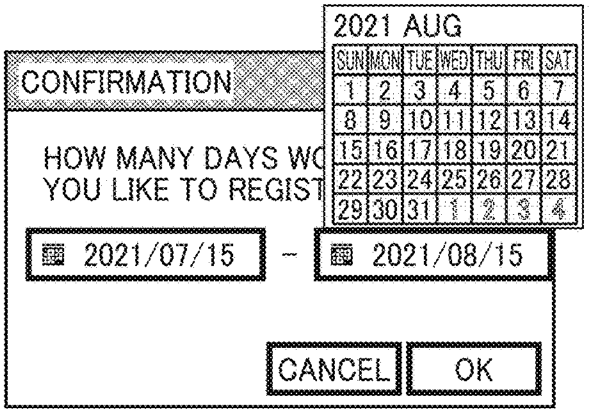
Figure 20D:
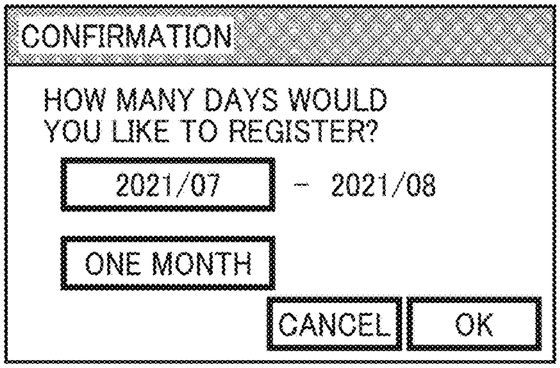

Instead of extending the read medicine dispensing data to the specified date on a monthly basis as illustrated in FIG. 20A, a calendar may be displayed to specify a date as illustrated in FIG. 20B. Alternatively, as illustrated in FIG. 20C, a calendar may be displayed to select two periods including a start time and an end time. Alternatively, as illustrated in FIG. 20D, a certain period of time may be specified.

The display screen 220 according to the present embodiment on which the generated medicine dispensing management data is displayed after the number of days you want to register is specified is described below with reference to FIG. 21 and FIG. 22.

Figure 21:
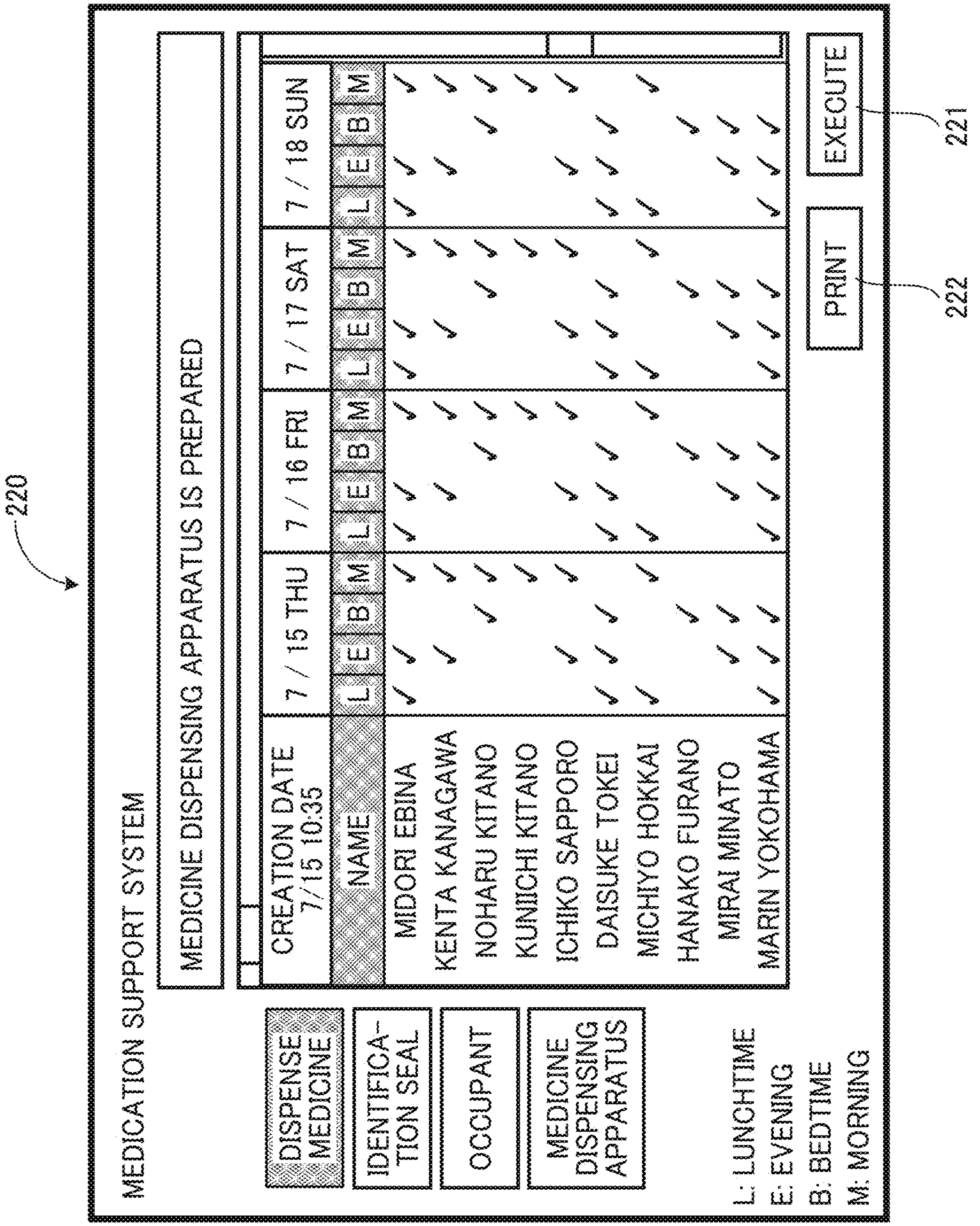
FIG. 21 is a diagram illustrating a display screen according to an embodiment of the present disclosure.

FIG. 21 is a diagram illustrating the display screen 220 on which the generated medicine dispensing management data is displayed after the number of days you want to register is specified, according to the present embodiment.

Figure 22:
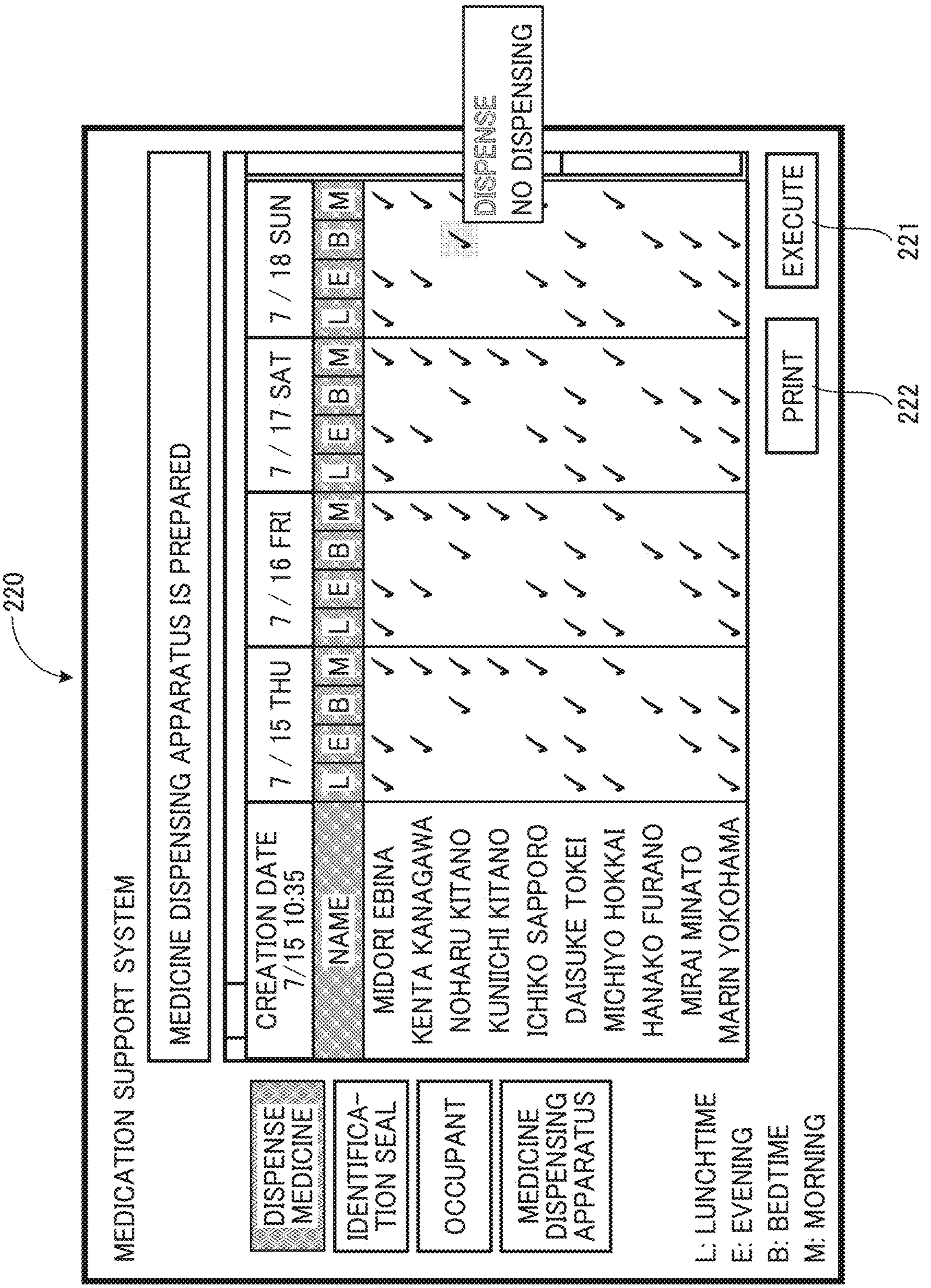
FIG. 22 is a diagram illustrating a display screen according to a modification of the above embodiments of the present disclosure as illustrated in FIG. 21.

FIG. 22 is a diagram illustrating whether medicines are to be dispensed can be changed for each patient who takes medicines, on the display screen 220 as illustrated in FIG. 21, before medicine dispensing operation is done, according to the present embodiment.

On the display screen 220 as illustrated in FIG. 22, "medicines are to be dispensed" or "medicines are not to be dispensed" can be selected for each patient who takes medicines before medicine dispensing operation is to be done, as displayed on the right side of the display screen 220 as illustrated in FIG. 22.

When an execution key 221 is touched or clicked to dispense medicine using, for example, a computer mouse on the display screen 220 as illustrated in FIG. 21, the medication-related information is checked against the medicine dispensing information, and medicines are dispensed after it is determined that the medication-related information matches the medicine dispensing information.

For example, when the medicine dispensing on July 15 (Thursday) is to be done based on the display screen 220 as illustrated in FIG. 21, the name of a patient who takes medicines, such as Midori Ebina, and the times of medication such as lunchtime, which are the medicine dispensing information marked with ticks, are recognized, and the carriage 50 moves to a specified position of one of the multiple cartridges 10 in which a medicine pack is stored, which is indicated by the coordinates (1-1-1), based on the medication-related information as illustrated in FIG. 17, to pick up one medicine pack. Subsequently, the carriage 50 according to the present embodiment moves to the coordinates (1-1-1) that is a specified partition of the medicine dispensing tray 30 or one of the multiple subdivision boxes 34 at the coordinates (1-1-1), which is the position corresponding to the specified partition, based on the medication-related information as illustrated in FIG. 17, and the medicine pack is inserted. This series of operation is repeated for each item marked with a tick. By so doing, the delivery of the medicine pack to the specified one of the multiple medicine dispensing trays or the specified one of the multiple subdivision boxes 34 can be completed.

On the display screen 220 where a chart of medicine dispensing management is displayed as illustrated in FIG. 21, a print key 222 is touched or clicked using, for example, a computer mouse. By so doing, a chart of medicine dispensing management can be printed. A table of medication administration that is obtained by printing the chart of medicine dispensing management as illustrated in FIG. 21 is illustrated in FIG. 23. The medicine pack to be dispensed is compared with the medicine pack in the medicine dispensing tray 30, which has been dispensed in the past, based on the printed table. The result of medicine dispensing is finally confirmed by a nurse practitioner, and the table of medication administration as illustrated in FIG. 23 is also passed together at the time of handover to a care worker who assists medication. By so doing, the needs of assists in medication can be confirmed. Such a confirmation may be made by, for example, filling or highlighting the cell to make it easy to see.

FIG. 24 is a table of medication administration different from the table of medication administration of the medicine dispensing data file 219 as illustrated in FIG. 18, according to the present embodiment.

The medicine dispensing data file 219 according to the present embodiment is not limited to a table of medication administration in the medicine dispensing data file 219, as illustrated in FIG. 18, and may be a table for one day as illustrated in FIG. 24. Depending on the day-care center or nursing home, the type of medicines to be taken by occupants barely changes by day. In order to handle such a situation, for example, a selection is made to extend the read medicine dispensing data to the designated date. Registration is performed on a monthly basis to be managed. By so doing, medicine dispensing management data of that month can be generated.

In the case of Marin Yokohama (titles of respect are omitted) in the table of medication administration as illustrated in FIG. 24, medicines in a medicine pack are prescribed once a week or once a month in addition to the medicines to be taken on a daily basis. In order for such an operation to be identified by the medicine dispensing data management system 213, separate frames are arranged and a day of the week or dates are listed in those frames. By so doing, those items of information can be read by the medicine dispensing data management system 213. As illustrated in FIG. 24, predetermined texts in parentheses may be input next to the relevant names to achieve a similar effect. However, in the table of medication administration as illustrated in FIG. 24, a nurse practitioner or the like has to make an input manually. An error occurs when a wrong day of the week or texts unrecognizable by the medicine dispensing data management system 213 (see FIG. 16) are input. In this sense, manual input may cause medication error. However, the table for management can be simplified.

FIG. 25 is a table of medication administration different from the table of medication administration of the medicine dispensing data file 219 as illustrated in FIG. 18 or FIG. 24, according to the present embodiment.

In the case of the table of medication administration as illustrated in FIG. 25, selection is to be made on cell-by-cell basis, and the possibility of an error is relatively low. However, if a larger area is to be displayed in the table and texts or images appear small on the screen, the visual recognizability may deteriorate.

Figure 26:
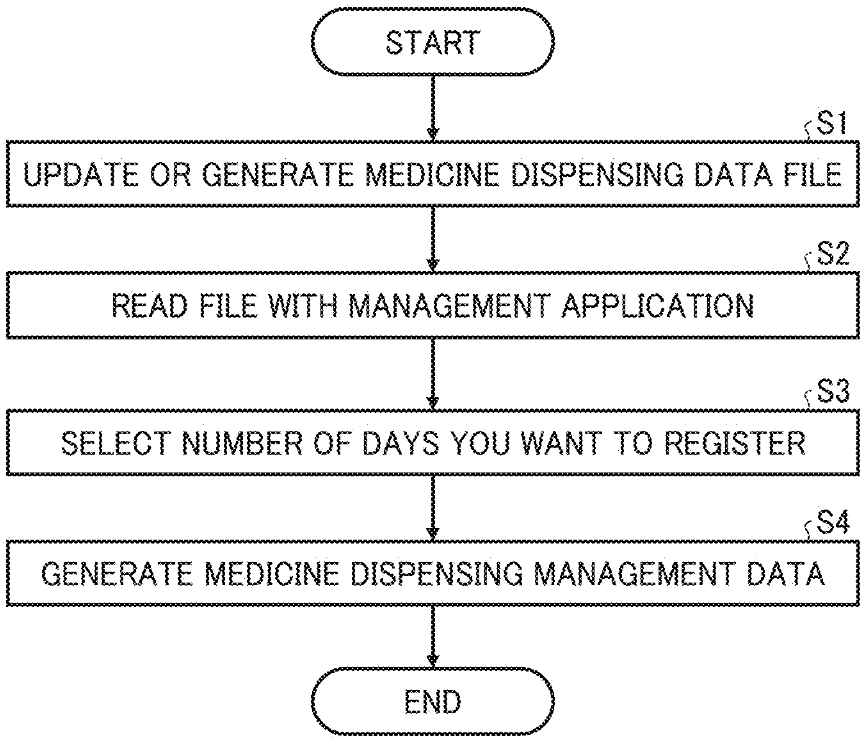
FIG. 26 is a flowchart of the operation of updating a medicine dispensing data file, according to an embodiment of the present disclosure.

FIG. 26 is a flowchart of the operation of updating the medicine dispensing data file 219, according to the present embodiment.

When the medicine dispensing data file 219 (see FIG. 16) is to be updated or prepared, firstly, in a step S2, a file is read by the medicine dispensing data management system 213 according to the present embodiment (see FIG. 16) of the management application 211. Subsequently, in steps S2 to S4, the number of days you want to register is selected, and then medicine dispensing management data is generated.

The above embodiments of the present disclosure described above substantially include, for example, the following modifications.

The medication support device such as the medication support device 300 according to the first aspect of the present disclosure includes a container such as the cartridge 10 that stores a plurality of medicine packs, a medicine dispenser such as medicine dispensing tray 30 in which the specific one of the plurality of medicine packs is arranged, a pickup device such as the carriage 50 configured to pick up a specific one of the multiple medicine packs from the container, a conveyor such as the conveyance unit 90 configured to convey the specific one of the plurality of medicine packages picked up from the container, a medication-related information reader such as the medication-related information reader unit 65 that scans and reads the medication-related information 6*c* of the medicine pack including at least a name of a patient who takes medicines and a time of medication, a pack data management system such as the pack data management system 212 that manages the medication-related information of the medicine pack, and a medicine dispensing data management system such as the medicine dispensing data management system 213 that reads and manages the medicine dispensing data including at least the name of a patient who takes medicines and the times of medication. The medicines are dispensed by checking the medicine dispensing data against the medication-related information.

With the medication support device according to the first mode of the present disclosure, the work hour and the work load can be reduced in the service of preparing for medication of, for example, a nurse practitioner and a care worker in a day-care center or nursing home, and a medication error can be prevented from occurring.

In other words, depending on the state of the patient who takes medicines, the patient may or may not take the medicine. In order to handle such a situation, medicines are appropriately dispensed to a patient to which medication needs to be given, based on the medicine dispensing data on the medicine pack generated based on the medicine dispensing data and the prescription by a doctor.

According to the second mode of the present disclosure, in the medication support device according to the first aspect of the present disclosure, the medicine dispensing data generated outside the medicine dispensing data management system 213 is read by the medicine dispensing data management system.

With the medication support device according to the second aspect of the present disclosure, the medicine dispensing data including at least the name of a patient who takes medicines and the times of medication is read. Due to such a configuration, a medication support device or a medication support system can be installed without changing the current workflow.

Third Aspect

In the medication support device such as the medication support device 300 according to the second aspect of the present disclosure, the medicine dispensing data generated and read outside the medicine dispensing data management system includes at least a time of medication and medicine information for each patient who takes medicines.

With the medication support device according to the third aspect of the present disclosure, the times of medication such as, in the morning, at lunchtime, in the evening, and before going to the bed can appropriately be managed for each patient who takes medicines. In particular, the times of medication can be managed using a table.

Fourth Aspect

In the medication support device such as the medication support device 300 according to any one of the first aspect to the third aspect of the present disclosure, the medicine dispensing data read by the medicine dispensing data management system is extended to a plurality of days.

With the medication support device according to the fourth aspect of the present disclosure, the medicine dispensing data is read from an external device only once, and there is no need to read the medicine dispensing data again as long as the medicine dispensing data such as the names of patients who take medicines and the medicine information remain unchanged.

Fifth Aspect

In the medication support device according to any one of the first aspect to the fourth aspect of the present disclosure, the medicine dispensing data management system is configured to change the times of medication in the medicine dispensing data extended to a plurality of days.

With the medication support device according to the fifth aspect of the present disclosure, before medicine dispensing operation is to be done, whether the medicines are dispensed or not can easily be changed depending on the circumstances of a patient who takes medicines.

Sixth Aspect

In the medication support device such as the medication support device 300 according to any one of the first aspect to the fifth aspect of the present disclosure, the medicine dispensing data management system is configured to specify the number of extendable days to a plurality of days.

With the medication support device according to the sixth aspect of the present disclosure, the number of extendable days can be changed by a user.

Seventh Aspect

In the medication support device such as the medication support device 300 according to any one of the first aspect to the sixth aspect of the present disclosure, the medicine dispensing data management system is configured to print a result of medicine dispensing.

With the medication support device according to the seventh aspect of the present disclosure, the actual medicine dispensing results can be printed, and the printed material can be used as a check list that is finally confirmed by a nurse practitioner.

Eighth Aspect

In the medication support device such as the medication support device 300 according to any one of the first aspect to the seventh aspect of the present disclosure, the medicine dispensing data management system is configured to store the results of medicine dispensing or the change history.

With the medication support device according to the eighth aspect of the present disclosure, the actual medicine dispensing results are stored as traceability information. Due to such a configuration, reviewing is possible when a problem occurs.

Ninth Aspect

In the medication support device such as the medication support device 300 according to any one of the first aspect to the eighth aspect of the present disclosure, the plurality of medicine packs are stacked on top of each other and stored in layers in the holder, and the plurality of medicine packs include a plurality of medicine packages in each of which a plurality of medicines are packed and a plurality of bound medicine packages in which the plurality of medicine packages are stacked on top of each other in layers and bound together.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A medication support device comprising:

a plurality of containers configured to store a plurality of medicine packs by type;

a medicine dispenser including a plurality of subdivision boxes and a plurality of partitions, each partition of the plurality of partitions corresponding to a patient, and each partition configured to store a specific medicine pack of the plurality of medicine packs associated with the corresponding patient, the plurality of subdivision boxes including two or more partitions of the plurality of partitions;

a pickup device configured to pick up the specific medicine pack from a desired container of the plurality of containers;

a conveyor configured to convey the specific medicine pack picked up from the desired container;

a medication-related information reader configured to read medication-related information from the plurality of medicine packs, the read medication-related information including at least a name of a patient who takes a medicine and a time of medication for each medicine pack of the plurality of medicine packs;

a pack data management system configured to manage the medication-related information of the plurality of medicine packs; and a medicine dispensing data management system configured to, read and manage medicine dispensing data, the medicine dispensing data including at least the name of the patient who takes the medicine and the time of medication, and cause the pickup device to dispense the medicine corresponding to the patient at a desired time by checking the medicine dispensing data against the name of the patient and the time of medication, wherein each container of the plurality of containers is configured to store the plurality of medicine packs such that the plurality of medicine packs are stacked on top of each other in layers, and the plurality of medicine packs include, a plurality of medicine packages in each of which a plurality of medicines including the medicine are packed, and a plurality of bound medicine packages in each of which the plurality of medicine packages are stacked on top of each other in layers and bound together, each container of the plurality of containers includes a pickup slot on a bottom portion of the container, and the pickup device is further configured to, pick up the specific medicine pack from the desired container through the pickup slot, and read the medication-related information of the specific medicine pack through the pickup slot.

2. The medication support device according to claim 1, wherein the medicine dispensing data management system is further configured to read the medicine dispensing data generated outside the medicine dispensing data management system.

3. The medication support device according to claim 2, wherein the medicine dispensing data includes at least the time of medication and medicine information for each patient who takes the medicine.

4. The medication support device according to claim 1, wherein the medicine dispensing data management system is further configured to store the read medicine dispensing data for a plurality of days and omit reading the medicine dispensing data generated outside the medicine dispensing data management system again for the plurality of days.

5. The medication support device according to claim 1, wherein the medicine dispensing data management system is further configured to change the time of medication in the medicine dispensing data to a plurality of days.

6. The medication support device according to claim 1, wherein the medicine dispensing data management system is further configured to specify a number of extendable days for a plurality of days.

7. The medication support device according to claim 1, wherein the medicine dispensing data management system is further configured to print a result of medicine dispensing.

8. The medication support device according to claim 1, wherein the medicine dispensing data management system is further configured to store a result of medicine dispensing or change history.

9. The medication support device according to claim 1, wherein each partition of the plurality of partitions further includes:

an identifier identifying the corresponding patient.

10. The medication support device according to claim 9, wherein the pickup device further includes:

a suction device configured to pick up the specific medicine pack from the partition based on the identifier.

11. The medication support device according to claim 10, wherein the identifier is at least one of:

a quick response code, a non-contact integrated circuit tag, a number, a barcode, or any combinations thereof.

12. The medication support device according to claim 10, wherein the medication-related information further includes coordinate information indicating current position coordinates of the desired container containing the specific medicine.

13. The medication support device according to claim 12, wherein the suction device is further configured to:

pick up the specific medicine pack from the desired container based on the coordinate information.

14. The medication support device according to claim 10, wherein the pickup device further includes at least three motors configured to cause the pickup device to move in at least three directions.

15. The medication support device according to claim 10, wherein the pickup device further includes a suction device motor configured to change a posture of the suction device.

16. The medication support device according to claim 1, wherein each of the plurality of subdivision boxes are detachable from the medicine dispenser.

17. The medication support device according to claim 13, wherein the pickup device is further configured to:

move to a desired location relative to the medicine dispenser based on the medication-related information; and transfer the picked up specific medicine pack into a desired partition of the plurality of partitions based on the medication-related information.

18. The medication support device according to claim 1, further comprising:

a plurality of drawers, each drawer of the plurality of drawers configured to store two or more containers of the plurality of containers.

19. The medication support device according to claim 18, wherein each of the two or more containers is configured to be detachably coupled to at least one inner wall of a corresponding drawer of the plurality of drawers.

20. The medication support device according to claim 18, wherein each drawer includes:

a plurality of indicator lights configured to indicate a status of a corresponding container of the two or more containers stored in the drawer.

* * * * *